US008214497B2

(12) United States Patent
Alperovitch et al.

(10) Patent No.: US 8,214,497 B2
(45) Date of Patent: Jul. 3, 2012

(54) MULTI-DIMENSIONAL REPUTATION SCORING

(75) Inventors: Dmitri Alperovitch, Atlanta, GA (US); Tomo Foote-Lennox, Maple Grove, MN (US); Jeremy Gould, Atlanta, GA (US); Paula Greve, Lino Lakes, MN (US); Alejandro Manuel Hernandez, Cartersville, GA (US); Paul Judge, Atlanta, GA (US); Sven Krasser, Atlanta, GA (US); Tim Lange, Bielefeld (DE); Phyllis Adele Schneck, Atlanta, GA (US); Martin Stecher, Paderborn (DE); Yuchun Tang, Roswell, GA (US); Aarjav Jyotindra Neeta Trivedi, Atlanta, GA (US); Lamar Lorenzo Willis, Woodstock, GA (US); Weilai Yang, Alpharetta, GA (US); Jonathan Alexander Zdziarski, Milledgeville, GA (US)

(73) Assignee: McAfee, Inc., Santa Clara, CA (US)

( * ) Notice: Subject to any disclaimer, the term of this patent is extended or adjusted under 35 U.S.C. 154(b) by 725 days.

(21) Appl. No.: 11/626,603

(22) Filed: Jan. 24, 2007

(65) Prior Publication Data

US 2008/0175266 A1    Jul. 24, 2008

(51) Int. Cl.
*G06F 15/173* (2006.01)
*G06F 15/16* (2006.01)
(52) U.S. Cl. ........ 709/226; 709/224; 709/225; 709/205; 709/206
(58) Field of Classification Search .................. 709/203, 709/206, 223–226, 705, 706; 726/1, 14, 726/22; 705/1, 35
See application file for complete search history.

(56) References Cited

U.S. PATENT DOCUMENTS

| 4,289,930 | A | 9/1981 | Connolly et al. |
| 4,384,325 | A | 5/1983 | Slechta et al. |
| 4,386,416 | A | 5/1983 | Giltner et al. |
| 4,532,588 | A | 7/1985 | Foster |
| 4,713,780 | A | 12/1987 | Schultz et al. |
| 4,754,428 | A | 6/1988 | Schultz et al. |
| 4,837,798 | A | 6/1989 | Cohen et al. |
| 4,853,961 | A | 8/1989 | Pastor |
| 4,864,573 | A | 9/1989 | Horsten |
| 4,951,196 | A | 8/1990 | Jackson |
| 4,975,950 | A | 12/1990 | Lentz |
| 4,979,210 | A | 12/1990 | Nagata et al. |
| 5,008,814 | A | 4/1991 | Mathur |

(Continued)

FOREIGN PATENT DOCUMENTS

| CA | 2564533 | 12/2005 |
| EP | 0375138 A2 | 6/1990 |

(Continued)

OTHER PUBLICATIONS

Article entitled "An Example-Based Mapping Method for Text Categorization and Retrieval" by Yang et. al., in *ACM Transactions on Information Systems*, Jul. 1994, vol. 12, No. 3, pp. 252-277.

(Continued)

*Primary Examiner* — Carl Colin
*Assistant Examiner* — Catherine Thiaw
(74) *Attorney, Agent, or Firm* — Fish & Richardson P.C.

(57) ABSTRACT

Methods and systems for assigning reputation to communications entities include collecting communications data from distributed agents, aggregating the communications data, analyzing the communications data and identifying relationships between communications entities based upon the communications data.

39 Claims, 15 Drawing Sheets

U.S. PATENT DOCUMENTS

| | | |
|---|---|---|
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,621,889 A | 4/1997 | Lermuzeaux et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Beck et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,088,804 A | 7/2000 | Hill et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,118,886 A | 9/2000 | Baumgari et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |

| | | | | | |
|---|---|---|---|---|---|
| 6,141,778 A | 10/2000 | Kane et al. | 6,742,128 B1 | 5/2004 | Joiner |
| 6,145,083 A | 11/2000 | Shaffer et al. | 6,754,705 B1 | 6/2004 | Joiner et al. |
| 6,151,675 A | 11/2000 | Smith | 6,757,830 B1 | 6/2004 | Tarbotton et al. |
| 6,161,130 A | 12/2000 | Horvitz et al. | 6,760,309 B1 | 7/2004 | Rochberger et al. |
| 6,165,314 A | 12/2000 | Gardner et al. | 6,768,991 B2 | 7/2004 | Hearnden |
| 6,185,689 B1 | 2/2001 | Todd, Sr. et al. | 6,769,016 B2 | 7/2004 | Rothwell et al. |
| 6,192,360 B1 | 2/2001 | Dumais et al. | 6,772,196 B1 | 8/2004 | Kirsch et al. |
| 6,192,407 B1 | 2/2001 | Smith et al. | 6,775,657 B1 | 8/2004 | Baker |
| 6,199,102 B1 | 3/2001 | Cobb | 6,792,546 B1 | 9/2004 | Shanklin et al. |
| 6,202,157 B1 | 3/2001 | Brownlie et al. | 6,880,156 B1 | 4/2005 | Landherr et al. |
| 6,219,714 B1 | 4/2001 | Inhwan et al. | 6,892,178 B1 | 5/2005 | Zacharia |
| 6,223,213 B1 | 4/2001 | Cleron et al. | 6,892,179 B1 | 5/2005 | Zacharia |
| 6,249,575 B1 | 6/2001 | Heilmann et al. | 6,892,237 B1 | 5/2005 | Gai et al. |
| 6,249,807 B1 | 6/2001 | Shaw et al. | 6,895,385 B1 | 5/2005 | Zacharia et al. |
| 6,260,043 B1 | 7/2001 | Puri et al. | 6,907,430 B2 | 6/2005 | Chong et al. |
| 6,269,447 B1 | 7/2001 | Maloney et al. | 6,910,135 B1 | 6/2005 | Grainger |
| 6,269,456 B1 | 7/2001 | Hodges et al. | 6,928,556 B2 | 8/2005 | Black et al. |
| 6,272,532 B1 | 8/2001 | Feinleib | 6,941,348 B2 | 9/2005 | Petry et al. |
| 6,275,942 B1 | 8/2001 | Bernhard et al. | 6,941,467 B2 | 9/2005 | Judge et al. |
| 6,279,113 B1 | 8/2001 | Vaidya | 6,968,461 B1 | 11/2005 | Lucas et al. |
| 6,279,133 B1 | 8/2001 | Vafai et al. | 6,981,143 B2 | 12/2005 | Mullen et al. |
| 6,282,565 B1 | 8/2001 | Shaw et al. | 7,051,077 B2 | 5/2006 | Lin |
| 6,285,991 B1 | 9/2001 | Powar | 7,089,428 B2 | 8/2006 | Farley et al. |
| 6,289,214 B1 | 9/2001 | Backstrom | 7,092,992 B1 | 8/2006 | Yu |
| 6,298,445 B1 | 10/2001 | Shostack et al. | 7,117,358 B2 | 10/2006 | Bandini et al. |
| 6,301,668 B1 | 10/2001 | Gleichauf et al. | 7,143,213 B2 | 11/2006 | Need et al. |
| 6,304,898 B1 | 10/2001 | Shiigi | 7,152,105 B2 | 12/2006 | McClure et al. |
| 6,304,973 B1 | 10/2001 | Williams | 7,155,243 B2 | 12/2006 | Baldwin et al. |
| 6,311,207 B1 | 10/2001 | Mighdoll et al. | 7,164,678 B2 | 1/2007 | Connor |
| 6,317,829 B1 | 11/2001 | Van Oorschot | 7,254,712 B2 | 8/2007 | Godfrey et al. |
| 6,320,948 B1 | 11/2001 | Heilmann et al. | 7,272,149 B2 | 9/2007 | Bly et al. |
| 6,321,267 B1 | 11/2001 | Donaldson | 7,272,853 B2 | 9/2007 | Goodman et al. |
| 6,324,569 B1 | 11/2001 | Ogilvie et al. | 7,349,332 B1 | 3/2008 | Srinivasan et al. |
| 6,324,647 B1 | 11/2001 | Bowman-Amuah | 7,376,731 B2 | 5/2008 | Khan et al. |
| 6,324,656 B1 | 11/2001 | Gleichauf et al. | 7,385,924 B1 | 6/2008 | Riddle |
| 6,330,589 B1 | 12/2001 | Kennedy | 7,460,476 B1 | 12/2008 | Morris et al. |
| 6,347,374 B1 | 2/2002 | Drake et al. | 7,461,339 B2 | 12/2008 | Liao et al. |
| 6,353,886 B1 | 3/2002 | Howard et al. | 7,496,634 B1 | 2/2009 | Cooley |
| 6,363,489 B1 | 3/2002 | Comay et al. | 7,522,516 B1 | 4/2009 | Parker |
| 6,370,648 B1 | 4/2002 | Diep | 7,543,056 B2 * | 6/2009 | McClure et al. ............... 709/224 |
| 6,373,950 B1 | 4/2002 | Rowney | 7,545,748 B1 | 6/2009 | Riddle |
| 6,385,655 B1 | 5/2002 | Smith et al. | 7,610,344 B2 * | 10/2009 | Mehr et al. .................... 709/206 |
| 6,393,465 B2 | 5/2002 | Leeds | 7,617,160 B1 | 11/2009 | Grove et al. |
| 6,393,568 B1 | 5/2002 | Ranger et al. | 7,620,986 B1 | 11/2009 | Jagannathan et al. |
| 6,405,318 B1 | 6/2002 | Rowland | 7,644,127 B2 | 1/2010 | Yu |
| 6,434,624 B1 | 8/2002 | Gai et al. | 7,730,316 B1 | 6/2010 | Baccash |
| 6,442,588 B1 | 8/2002 | Clark et al. | 7,739,253 B1 | 6/2010 | Yanovsky et al. |
| 6,442,686 B1 | 8/2002 | McArdle et al. | 7,870,203 B2 | 1/2011 | Judge et al. |
| 6,453,345 B2 | 9/2002 | Trcka et al. | 7,899,866 B1 * | 3/2011 | Buckingham et al. ......... 709/206 |
| 6,460,141 B1 | 10/2002 | Olden | 7,937,480 B2 | 5/2011 | Alperovitch et al. |
| 6,470,086 B1 | 10/2002 | Smith | 8,079,087 B1 * | 12/2011 | Spies et al. ..................... 726/26 |
| 6,487,599 B1 | 11/2002 | Smith et al. | 2001/0037311 A1 * | 11/2001 | McCoy et al. .................. 705/65 |
| 6,487,666 B1 | 11/2002 | Shanklin et al. | 2001/0049793 A1 | 12/2001 | Sugimoto |
| 6,502,191 B1 | 12/2002 | Smith et al. | 2002/0004902 A1 | 1/2002 | Toh et al. |
| 6,516,411 B2 | 2/2003 | Smith | 2002/0013692 A1 | 1/2002 | Chandhok et al. |
| 6,519,703 B1 | 2/2003 | Joyce | 2002/0016910 A1 | 2/2002 | Wright et al. |
| 6,539,430 B1 | 3/2003 | Humes | 2002/0023089 A1 | 2/2002 | Woo |
| 6,546,416 B1 | 4/2003 | Kirsch | 2002/0023140 A1 | 2/2002 | Hile et al. |
| 6,546,493 B1 | 4/2003 | Magdych et al. | 2002/0026591 A1 | 2/2002 | Hartley et al. |
| 6,550,012 B1 | 4/2003 | Villa et al. | 2002/0032871 A1 | 3/2002 | Malan et al. |
| 6,574,737 B1 | 6/2003 | Kingsford et al. | 2002/0035683 A1 | 3/2002 | Kaashoek et al. |
| 6,578,025 B1 | 6/2003 | Pollack et al. | 2002/0042876 A1 | 4/2002 | Smith |
| 6,609,196 B1 | 8/2003 | Dickinson, III et al. | 2002/0046041 A1 | 4/2002 | Lang |
| 6,650,890 B1 | 11/2003 | Irlam et al. | 2002/0049853 A1 | 4/2002 | Chu et al. |
| 6,654,787 B1 | 11/2003 | Aronson et al. | 2002/0051575 A1 | 5/2002 | Myers et al. |
| 6,675,153 B1 | 1/2004 | Cook et al. | 2002/0059454 A1 | 5/2002 | Barrett et al. |
| 6,681,331 B1 | 1/2004 | Munson et al. | 2002/0062368 A1 | 5/2002 | Holtzman et al. |
| 6,687,687 B1 | 2/2004 | Smadja | 2002/0078382 A1 | 6/2002 | Sheikh et al. |
| 6,697,950 B1 | 2/2004 | Ko | 2002/0087882 A1 | 7/2002 | Schneier et al. |
| 6,701,440 B1 | 3/2004 | Kim et al. | 2002/0095492 A1 | 7/2002 | Kaashoek et al. |
| 6,704,874 B1 | 3/2004 | Porras et al. | 2002/0112013 A1 * | 8/2002 | Walsh ............................ 709/206 |
| 6,711,127 B1 | 3/2004 | Gorman et al. | 2002/0112185 A1 | 8/2002 | Hodges |
| 6,711,687 B1 | 3/2004 | Sekiguchi | 2002/0116627 A1 | 8/2002 | Tarbotton et al. |
| 6,725,377 B1 | 4/2004 | Kouznetsov | 2002/0120853 A1 | 8/2002 | Tyree |
| 6,732,101 B1 | 5/2004 | Cook | 2002/0133365 A1 | 9/2002 | Grey et al. |
| 6,732,157 B1 | 5/2004 | Gordon et al. | 2002/0138416 A1 | 9/2002 | Lovejoy et al. |
| 6,735,703 B1 | 5/2004 | Kilpatrick et al. | 2002/0138755 A1 | 9/2002 | Ko |
| 6,738,462 B1 | 5/2004 | Brunson | 2002/0138759 A1 | 9/2002 | Dutta |
| 6,742,124 B1 | 5/2004 | Kilpatrick et al. | 2002/0138762 A1 | 9/2002 | Horne |

| | | | | | | |
|---|---|---|---|---|---|---|
| 2002/0143963 A1 | 10/2002 | Converse et al. | 2003/0172302 A1 | 9/2003 | Judge et al. | |
| 2002/0147734 A1 | 10/2002 | Shoup et al. | 2003/0182421 A1* | 9/2003 | Faybishenko et al. | 709/224 |
| 2002/0152399 A1 | 10/2002 | Smith | 2003/0187936 A1 | 10/2003 | Bodin et al. | |
| 2002/0165971 A1 | 11/2002 | Baron | 2003/0187996 A1 | 10/2003 | Cardina et al. | |
| 2002/0169954 A1 | 11/2002 | Bandini et al. | 2003/0204596 A1* | 10/2003 | Yadav | 709/226 |
| 2002/0172367 A1 | 11/2002 | Mulder et al. | 2003/0204719 A1 | 10/2003 | Ben | |
| 2002/0178227 A1 | 11/2002 | Matsa et al. | 2003/0212791 A1 | 11/2003 | Pickup | |
| 2002/0178383 A1 | 11/2002 | Hrabik et al. | 2003/0233328 A1 | 12/2003 | Scott et al. | |
| 2002/0178410 A1 | 11/2002 | Haitsma et al. | 2004/0015554 A1 | 1/2004 | Wilson | |
| 2002/0188864 A1 | 12/2002 | Jackson | 2004/0025044 A1 | 2/2004 | Day | |
| 2002/0194469 A1 | 12/2002 | Dominique et al. | 2004/0054886 A1 | 3/2004 | Dickinson et al. | |
| 2002/0199095 A1 | 12/2002 | Bandini et al. | 2004/0058673 A1 | 3/2004 | Iriam et al. | |
| 2003/0005326 A1 | 1/2003 | Flemming | 2004/0059811 A1 | 3/2004 | Sugauchi et al. | |
| 2003/0005331 A1 | 1/2003 | Williams | 2004/0088570 A1 | 5/2004 | Roberts et al. | |
| 2003/0009554 A1 | 1/2003 | Burch et al. | 2004/0111519 A1 | 6/2004 | Fu et al. | |
| 2003/0009693 A1 | 1/2003 | Brock et al. | 2004/0111531 A1 | 6/2004 | Staniford et al. | |
| 2003/0009696 A1 | 1/2003 | Bunker, V et al. | 2004/0122926 A1 | 6/2004 | Moore et al. | |
| 2003/0009699 A1 | 1/2003 | Gupta et al. | 2004/0139160 A1 | 7/2004 | Wallace et al. | |
| 2003/0014664 A1 | 1/2003 | Hentunen | 2004/0139334 A1 | 7/2004 | Wiseman | |
| 2003/0023692 A1 | 1/2003 | Moroo | 2004/0167968 A1 | 8/2004 | Wilson et al. | |
| 2003/0023695 A1 | 1/2003 | Kobata et al. | 2004/0177120 A1 | 9/2004 | Kirsch | |
| 2003/0023736 A1 | 1/2003 | Abkemeier | 2004/0203589 A1 | 10/2004 | Wang et al. | |
| 2003/0023873 A1 | 1/2003 | Ben-Itzhak | 2004/0205135 A1 | 10/2004 | Hallam | |
| 2003/0023874 A1 | 1/2003 | Prokupets et al. | 2004/0221062 A1 | 11/2004 | Starbuck et al. | |
| 2003/0023875 A1 | 1/2003 | Hursey et al. | 2004/0236884 A1 | 11/2004 | Beetz | |
| 2003/0028803 A1 | 2/2003 | Bunker, V et al. | 2004/0249895 A1* | 12/2004 | Way | 709/206 |
| 2003/0033516 A1 | 2/2003 | Howard et al. | 2004/0267893 A1 | 12/2004 | Lin | |
| 2003/0033542 A1 | 2/2003 | Goseva-Popstojanova et al. | 2005/0021738 A1 | 1/2005 | Goeller | |
| 2003/0041264 A1 | 2/2003 | Black et al. | 2005/0021997 A1 | 1/2005 | Beynon et al. | |
| 2003/0046253 A1 | 3/2003 | Shetty et al. | 2005/0052998 A1 | 3/2005 | Oliver et al. | |
| 2003/0051026 A1 | 3/2003 | Carter et al. | 2005/0060643 A1 | 3/2005 | Glass et al. | |
| 2003/0051163 A1 | 3/2003 | Bidaud | 2005/0065810 A1 | 3/2005 | Bouron | |
| 2003/0051168 A1 | 3/2003 | King et al. | 2005/0086300 A1* | 4/2005 | Yeager et al. | 709/204 |
| 2003/0055931 A1 | 3/2003 | Cravo De Almeida et al. | 2005/0091319 A1 | 4/2005 | Kirsch | |
| 2003/0061506 A1 | 3/2003 | Cooper et al. | 2005/0091320 A1 | 4/2005 | Kirsch et al. | |
| 2003/0065943 A1 | 4/2003 | Geis et al. | 2005/0102366 A1 | 5/2005 | Kirsch | |
| 2003/0084280 A1 | 5/2003 | Bryan et al. | 2005/0141427 A1 | 6/2005 | Bartky | |
| 2003/0084320 A1 | 5/2003 | Tarquini et al. | 2005/0149383 A1 | 7/2005 | Zacharia et al. | |
| 2003/0084323 A1 | 5/2003 | Gales | 2005/0159998 A1 | 7/2005 | Buyukkokten et al. | |
| 2003/0084347 A1 | 5/2003 | Luzzatto | 2005/0160148 A1 | 7/2005 | Yu | |
| 2003/0088792 A1 | 5/2003 | Card et al. | 2005/0192958 A1 | 9/2005 | Widjojo et al. | |
| 2003/0093667 A1 | 5/2003 | Dutta et al. | 2005/0198159 A1* | 9/2005 | Kirsch | 709/206 |
| 2003/0093695 A1 | 5/2003 | Dutta | 2005/0204001 A1 | 9/2005 | Stein et al. | |
| 2003/0093696 A1 | 5/2003 | Sugimoto | 2005/0216564 A1 | 9/2005 | Myers et al. | |
| 2003/0095555 A1 | 5/2003 | McNamara et al. | 2005/0256866 A1 | 11/2005 | Lu et al. | |
| 2003/0097439 A1 | 5/2003 | Strayer et al. | 2005/0262209 A1 | 11/2005 | Yu | |
| 2003/0097564 A1 | 5/2003 | Tewari et al. | 2005/0262210 A1 | 11/2005 | Yu | |
| 2003/0105976 A1 | 6/2003 | Copeland, III | 2005/0262556 A1 | 11/2005 | Waisman et al. | |
| 2003/0110392 A1 | 6/2003 | Aucsmith et al. | 2006/0009994 A1 | 1/2006 | Hogg et al. | |
| 2003/0110396 A1 | 6/2003 | Lewis et al. | 2006/0015942 A1 | 1/2006 | Judge et al. | |
| 2003/0115485 A1 | 6/2003 | Milliken | 2006/0023940 A1 | 2/2006 | Katsuyama | |
| 2003/0115486 A1 | 6/2003 | Choi et al. | 2006/0031314 A1 | 2/2006 | Brahms et al. | |
| 2003/0123665 A1 | 7/2003 | Dunstan et al. | 2006/0031483 A1* | 2/2006 | Lund et al. | 709/224 |
| 2003/0126464 A1 | 7/2003 | McDaniel et al. | 2006/0036693 A1 | 2/2006 | Hulten et al. | |
| 2003/0126472 A1 | 7/2003 | Banzhof | 2006/0036727 A1 | 2/2006 | Kurapati et al. | |
| 2003/0135749 A1 | 7/2003 | Gales et al. | 2006/0041508 A1 | 2/2006 | Pham et al. | |
| 2003/0140137 A1 | 7/2003 | Joiner et al. | 2006/0042483 A1 | 3/2006 | Work et al. | |
| 2003/0140250 A1 | 7/2003 | Taninaka et al. | 2006/0059238 A1* | 3/2006 | Slater et al. | 709/206 |
| 2003/0145212 A1 | 7/2003 | Crumly | 2006/0095404 A1 | 5/2006 | Adelman et al. | |
| 2003/0145225 A1 | 7/2003 | Bruton, III et al. | 2006/0095586 A1 | 5/2006 | Adelman et al. | |
| 2003/0145226 A1 | 7/2003 | Bruton, III et al. | 2006/0123083 A1 | 6/2006 | Goutte et al. | |
| 2003/0149887 A1 | 8/2003 | Yadav | 2006/0129810 A1* | 6/2006 | Jeong et al. | 713/166 |
| 2003/0149888 A1 | 8/2003 | Yadav | 2006/0149821 A1 | 7/2006 | Rajan et al. | |
| 2003/0152096 A1 | 8/2003 | Chapman | 2006/0155553 A1* | 7/2006 | Brohman et al. | 705/1 |
| 2003/0154393 A1 | 8/2003 | Young | 2006/0168024 A1 | 7/2006 | Mehr et al. | |
| 2003/0154399 A1 | 8/2003 | Zuk et al. | 2006/0174337 A1 | 8/2006 | Bernoth | |
| 2003/0154402 A1 | 8/2003 | Pandit et al. | 2006/0179113 A1* | 8/2006 | Buckingham et al. | 709/206 |
| 2003/0158905 A1 | 8/2003 | Petry et al. | 2006/0191002 A1 | 8/2006 | Lee et al. | |
| 2003/0159069 A1 | 8/2003 | Choi et al. | 2006/0212925 A1* | 9/2006 | Shull et al. | 726/1 |
| 2003/0159070 A1 | 8/2003 | Mayer et al. | 2006/0212930 A1 | 9/2006 | Shull et al. | |
| 2003/0167308 A1 | 9/2003 | Schran | 2006/0212931 A1 | 9/2006 | Shull et al. | |
| 2003/0167402 A1 | 9/2003 | Stolfo et al. | 2006/0225136 A1 | 10/2006 | Rounthwaite et al. | |
| 2003/0172166 A1 | 9/2003 | Judge et al. | 2006/0230039 A1 | 10/2006 | Shull et al. | |
| 2003/0172167 A1 | 9/2003 | Judge et al. | 2006/0230134 A1 | 10/2006 | Qian et al. | |
| 2003/0172289 A1 | 9/2003 | Soppera | 2006/0251068 A1 | 11/2006 | Judge et al. | |
| 2003/0172291 A1 | 9/2003 | Judge et al. | 2006/0253447 A1 | 11/2006 | Judge | |
| 2003/0172292 A1 | 9/2003 | Judge | 2006/0253458 A1 | 11/2006 | Dixon et al. | |
| 2003/0172294 A1* | 9/2003 | Judge | 713/200 | 2006/0253582 A1 | 11/2006 | Dixon et al. | |
| 2003/0172301 A1 | 9/2003 | Judge et al. | 2006/0253584 A1* | 11/2006 | Dixon et al. | 709/225 |

| | | | |
|---|---|---|---|
| 2006/0277259 | A1 | 12/2006 | Murphy et al. |
| 2007/0019235 | A1 | 1/2007 | Lee |
| 2007/0124803 | A1 | 5/2007 | Taraz |
| 2007/0130350 | A1 | 6/2007 | Alperovitch et al. |
| 2007/0130351 | A1 | 6/2007 | Alperovitch et al. |
| 2007/0199070 | A1 | 8/2007 | Hughes |
| 2007/0214151 | A1 | 9/2007 | Thomas et al. |
| 2008/0005223 | A1* | 1/2008 | Flake et al. ............... 709/203 |
| 2008/0077517 | A1* | 3/2008 | Sappington .................. 705/35 |
| 2008/0091765 | A1 | 4/2008 | Gammage et al. |
| 2008/0104180 | A1* | 5/2008 | Gabe .......................... 709/206 |
| 2008/0123823 | A1* | 5/2008 | Pirzada et al. ............. 379/88.11 |
| 2008/0159632 | A1 | 7/2008 | Oliver et al. |
| 2008/0175266 | A1 | 7/2008 | Alperovitch et al. |
| 2008/0178259 | A1 | 7/2008 | Alperovitch et al. |
| 2008/0178288 | A1 | 7/2008 | Alperovitch et al. |
| 2009/0003204 | A1 | 1/2009 | Okholm et al. |
| 2009/0113016 | A1 | 4/2009 | Sen et al. |
| 2009/0122699 | A1 | 5/2009 | Alperovitch et al. |
| 2009/0125980 | A1 | 5/2009 | Alperovitch et al. |
| 2009/0254499 | A1 | 10/2009 | Deyo |
| 2009/0254572 | A1 | 10/2009 | Redlich et al. |

FOREIGN PATENT DOCUMENTS

| | | |
|---|---|---|
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| EP | 1672558 A2 | 6/2006 |
| GB | 2271002 | 3/1994 |
| JP | 2000148276 A | 5/2000 |
| JP | 2000215046 A | 8/2000 |
| JP | 2001028006 A | 1/2001 |
| JP | 2004537075 A | 12/2004 |
| JP | 2006268544 A | 10/2006 |
| JP | 18350870 | 12/2006 |
| JP | 20070540073 A | 6/2008 |
| KR | 2006-0012137 | 2/2006 |
| KR | 2006012137 A | 2/2006 |
| KR | 2006028200 A | 3/2006 |
| KR | 1020060041934 | 5/2006 |
| KR | 699531 B1 | 3/2007 |
| KR | 737523 B1 | 7/2007 |
| KR | 750377 B1 | 8/2007 |
| KR | 447082 Y1 | 12/2009 |
| WO | WO 96/35994 | 11/1996 |
| WO | WO9635994 A1 | 11/1996 |
| WO | WO 99/05814 | 2/1999 |
| WO | WO 99/33188 | 7/1999 |
| WO | WO 99/37066 | 7/1999 |
| WO | WO0007312 A1 | 2/2000 |
| WO | WO0008543 A1 | 2/2000 |
| WO | WO 00/42748 | 7/2000 |
| WO | WO 01/17165 | 3/2001 |
| WO | WO 01/50691 | 7/2001 |
| WO | WO 01/76181 | 10/2001 |
| WO | WO0180480 A1 | 10/2001 |
| WO | WO 02/13469 | 2/2002 |
| WO | WO 02/13489 | 2/2002 |
| WO | WO0188834 A3 | 5/2002 |
| WO | WO 02/075547 | 9/2002 |
| WO | WO02082293 A1 | 10/2002 |
| WO | WO 02/091706 | 11/2002 |
| WO | WO 2004/061703 | 7/2004 |
| WO | WO2004061698 A1 | 7/2004 |
| WO | WO 2004/081734 | 9/2004 |
| WO | WO2004088455 A2 | 10/2004 |
| WO | WO2005086437 A1 | 9/2005 |
| WO | WO 2005/116851 | 12/2005 |
| WO | WO 2007030951 A1 * | 3/2007 |
| WO | WO2005116851 A3 | 4/2007 |

OTHER PUBLICATIONS

Article entitled "A Comparison of Two Learning Algorithms for Text Categorization" by Lewis et al., in *Third Annual Symposium on Document Analysis and Information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining*, 1996, pp. 335-338.

Article entitled "An Evaluation of Phrasal and Clustered Representations on a Text Categorization Task" by Lewis, in *15th Ann Int'l SIGIR*, Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

Article entitled "Hierarchically classifying documents using very few words" by Koller et. al., in *Proceedings of the Fourteenth International Conference on Machine Learning*, 1997.

Article entitled "Classification of Text Documents" by Li et. al., in *The Computer Journal*, vol. 41, No. 8, 1998, pp. 537-546.

Article entitled "Issues when designing filters in messaging systems" by Palme et. al., in 19 *Computer Communications*, 1996, pp. 95-101.

Article entitled "Text Categorization with Support Vector Machines: Learning with Many Relevant Features" by Joachins in *Machine Learning: ECML-98*, Apr. 1998, pp. 1-14.

Article entitled "Hierarchical Bayesian Clustering for Automatic Text Classification" by Iwayama et al. in *Natural Language*, pp. 1322-1327. Date unknown.

Article entitled "Smokey: Automatic Recognition of Hostile Messages" by Spertus in *Innovative Applications* 1997, pp. 1058-1065.

Article entitled "A Comparison of Classifiers and Document Representations for the Routing Problem" by Schutze. Date unknown.

Article entitled "CAFE: A Conceptual Model for Managing Information in Electronic Mail" by Takkinen et al. in *Proc. 31st Annual Hawaii International Conference on System Sciences*, 1998, pp. 44-53.

Article entitled "A Comparative Study on Feature Selection in Text Categorization" by Yang et. al. Date unknown.

Article entitled "Spam!" by Cranor et. al. in *Communications Of The ACM*, vol. 41, No. 8, Aug. 1998, pp. 74-83.

Article entitled "Sendmail And Spam" by LeFebvre in *Performance Computing*, Aug. 1998, pp. 55-58.

Article entitled "Implementing a Generalized Tool for Network Monitoring" by Ranum et. al. in *LISA XI*, Oct. 26-31, 1997, pp. 1-8.

Article entitled "Method for Automatic Contextual Transposition Upon Receipt of Item of Specified Criteria" printed Feb. 1994 in *IBM Technical Disclosure Bulletin* vol. 37, No. 2B, p. 333.

Article entitled "Toward Optimal Feature Selection" by Koller et al. in *Machine Learning: Proc. of the Thirteenth International Conference*, 1996.

Website: Technical Focus—Products—Entegrity AssureAccess. www2.entegrity.com.

Website: Create Secure Internet Communication Channels—Atabok Homepage. www.atabok.com.

Website: ATABOK VCNMAIL™ Secure Email Solution—Atabok Related Produces. www.atabok.com.

Website: ATABOK VCN Auto-Exchange™—Atabok Related Produces. www.atabok.com.

Website: Controlling Digital Assets Is a Paramount Need for All Business—Atabok Related Produces. www.atabok.com.

Website: Control Your Confidential Communications with ATABOK—Atabok Related Produces. www.atabok.com.

Website: Entrust Entelligence—Entrust Homepage. www.entrust.com.

Website: E-mail Plug-in—Get Technical/Interoperability—Entrust Entelligence. www.entrust.com.

Website: E-mail Plug-in—Get Technical/System Requirements—Entrust Entelligence. www.entrust.com.

Website: E-mail Plug-in—Features and Benefits—Entrust Entelligence. www.entrust.com.

Website: Internet Filtering Software—Internet Manager Homepage. www.elronsw.com.

Website: ESKE—Email with Secure Key Exchange—ESKE. www.danu.ie.

Website: Terminet—ESKE. www.danu.ie.

Website: Baltimore Focus on e-Security—Baltimore Technologies. www.baltimore.com.
Article entitled "Securing Electronic Mail Systems" by Serenelli et al., in *Communications-Fusing Command Control and Intelligence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference*, Jun. 6-10, 1994, pp. 37-44.
Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-4.
Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls for Sale" by Bryan, in *BYTE*, Apr. 1995, pp. 99-104.
Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across a Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Article entitled "Securing the Web: fire walls, proxy servers, and data driven attacks" by Farrow in *InfoWorld*, Jun. 19, 1995, vol. 17, No. 25, p. 103.
Website: Go Secure! for Microsoft Exchange—Products/Services—Verisign, Inc. www.verisign.com.
Article entitled "MIMEsweeper defuses virus network, net mail bombs" by Avery, in *Info World*, May 20, 1996, vol. 12, No. 21, p. N1.
Article entitled "Stomping out mail viruses" by Wilkerson, in *PC Week*, Jul. 15, 1996, p. N8.
USPTO Non-final Office Action in U.S. Appl. No. 11/626,479, mailed Mar. 17, 2010, 65 pages.
Abika.com, "Trace IP address, email or IM to owner or use," http://www.abika.com/help/IPaddressmap.htm, Jan. 25, 2006.
Abika.com, "Request a Persons Report," http.www.abika.com/forms/Verifyemailaddress.asp, 1 p. (Jan. 26, 2006).
Aikawa,Narichika, Q&A Collection: Personal computers have been introduced to junior high schools and accessing to the Internet has been started; however, we want to avoid the students from accessing harmful information. What can we do?. DOS/V Power Report. vol. 8, No. 5, Japan. Impress Co., Ltd., May 1, 1998, p. 358-361.
Ando, Ruo, Real-time neural detection with network capturing. Study report from Information Processing Society of Japan, vol. 2002. No. 12, IPSJ SIG Notes, Information Processing Society of Japan, Feb. 15, 2002, p. 145-150.
Article entitled "A Short Tutorial on Wireless LANs and IEEE 802.11" by Lough et al., printed May 27, 2002, in The IEEE Computer Society's Student Newsletter, Summer 1997, vol. 5, No. 2.
Article entitled "Firewall Systems: The Next Generation" by McGhie, in Integration Issues in Large Commercial Media Delivery Systems: Proc. of SPIE—The International Society for Optical Engineering, Oct. 23-24, 1995, pp. 270-281.

Edakandi, Ashwin Examiner's Report for Australian Patent Application No. 2006315164, dated Mar. 31, 2010.
European Supplementary Search Report for EP Application No. 03723691.6 dated Jun. 29, 2010.
China Patent Agent (H.K.) Ltd., First Office Action for Chinese Patent Application No. 200680050707.7, dated Mar. 9, 2010.
Memo entitled "SOCKS Protocol Version 5" by Leech et. al., in Standards Track, Mar. 1996, pp. 1-9.
First/Consequent Examination Report for IN Application No. 2639/DELNP/2004, Apr. 8, 2011.
Kim, JiSoo et al. "Text Locating form Natural Scene Images Using Image Intensities," 2005 IEEE.
Office Action for JP Application No. 2007-540073, dated Dec. 14, 2010.
Kane, Paul J. et al. "Quantification of Banding, Streaking and Grain in Flat Field Images," 2000.
Official Action (with uncertified Translation), Japanese Patent Application No. 2003-575222, Sep. 25, 2009.
Lane, Terran et al., "Sequence Matching and Learning in Anomaly Detection for Computer Security," AAAI Technical Report WS-97-07, 1997, p. 43-49.
Shishibori, Masami et al., "A Filtering Method for Mail Documents Using Personal Profiles," IEICE Technical Report, The Institute of Electronics, Information and Communication Engineers, vol. 98, No. 486, Dec. 17, 1998, p. 9-16.
Sobottka, K. et al. "Text extraction from colored book and journal covers," 2000.
Thomas, R. et al. "The Game Goes On: An Analysis of Modern SPAM Techniques," 2006.
U.S. Patent and Trademark Office Final Office Action Summary for U.S. Appl. No. 11/423,329, mailed Jan. 14, 2010.
U.S. Patent and Trademark Office Nonfinal Office Action Summary for U.S. Appl. No. 11/423,329, mailed Jun. 29, 2009.
U.S. Patent and Trademark Office Nonfinal Office Action Summary for U.S. Appl. No. 11/626,470, mailed Jan. 19, 2010.
U.S. Patent and Trademark Office Final Office Action Summary for U.S. Appl. No. 11/142,943, mailed Apr. 29, 2009.
U.S. Patent and Trademark Office Nonfinal Office Action Summary for U.S. Appl. No. 11/142,943, mailed Dec. 31, 2009.
U.S. Patent and Trademark Office Restriction Requirement for U.S. Appl. No. 11/142,943, mailed Jan. 13, 2009.
U.S. Patent and Trademark Office Nonfinal Office Action Summary for U.S. Appl. No. 11/142,943, mailed Jun. 26, 2008.
U.S. Patent and Trademark Office Nonfinal Office Action Summary for U.S. Appl. No. 11/937,274, mailed Dec. 9, 2009.
U.S. Patent and Trademark Office Nonfinal Office Action Summary for U.S. Appl. No. 11/937,274, mailed Jun. 29, 2009.
U.S. Patent and Trademark Office Nonfinal Office Action Summary for U.S. Appl. No. 11/626,603, mailed Dec. 2, 2009.
U.S. Patent and Trademark Office Restriction Requirement for U.S. Appl. No. 11/626,603, mailed Aug. 11, 2009.
PCT Notification of Search Report & Written Opinion, PCT/US2008/082781, Nov. 7, 2009.
PCT Notification of International Search Report & Written Opinion, PCT/US2009/039401, mailed Nov. 16, 2009.
PCT Notificetion of International Search Report & Written Opinion, PCT/US2008/051869, mailed Jun. 5, 2008.
PCT Notification Concerning Transmittal of International Preliminary Report on Patentability,, PCT/US2008/051865, mailed Aug. 6, 2009.
Official Action (with uncertified Translation), Japanese Patent Application No. 2007-540073, Jul. 7, 2011.
PCT Notification Concerning Transmittal of International Preliminary Report on Patentability, PCT/US2008/051876, mailed Aug. 6, 2009.
PCT Notification Concerning Transmittal of International Preliminary Report on Patentability, PCT/US2008/082771, mailed May 20, 2010.
PCT Notification of International Search Report & Written Opinion, PCT/US2008/082771, mailed Apr. 24, 2009.
U.S. Patent and Trademark Office final Office Acton Summary for U.S. Appl. No. 11/626,568, mailed Aug. 24, 2011.

U.S. Patent and Trademark Office final Office Action Summary for U.S. Appl. No. 11/626,603, mailed Mar. 28, 2011.
Supplementary European Search Report, PCT Application No. PCT/US2006/060771, dated Dec. 3, 2010.
Supplementary European Search Report, PCT Application No. PCT/US2006/060771, dated Dec. 21, 2010.
Extended European Search Report, PCT Application No. PCT/US2006/060771, dated Mar. 12, 2010.
Japanese Office Action for JP Application No. 2008-540356, dated Sep. 21, 2011.
Notification Concerning Availability of the Publication of the International Application, PCT/US2006/060771, dated Apr. 17, 2008.
PCT Notification Concerning Transmittal of International Preliminary Report on patentability,. PCT/US2008/051865, mailed Aug. 6, 2009.
Natsev, Apostol et al. "WALRUS: A Similarity Retrieval Algorithm for Image Databases," Mar. 2004.
Schleimer, Saul et al. "Winnowing: Local Algorithms for Document Fingerprinting," Jun. 2003.
Website: ESKE—Email with Secure Key Exchange—ESKE. www.danu.ie, Feb. 19, 2002, 1 page.

* cited by examiner

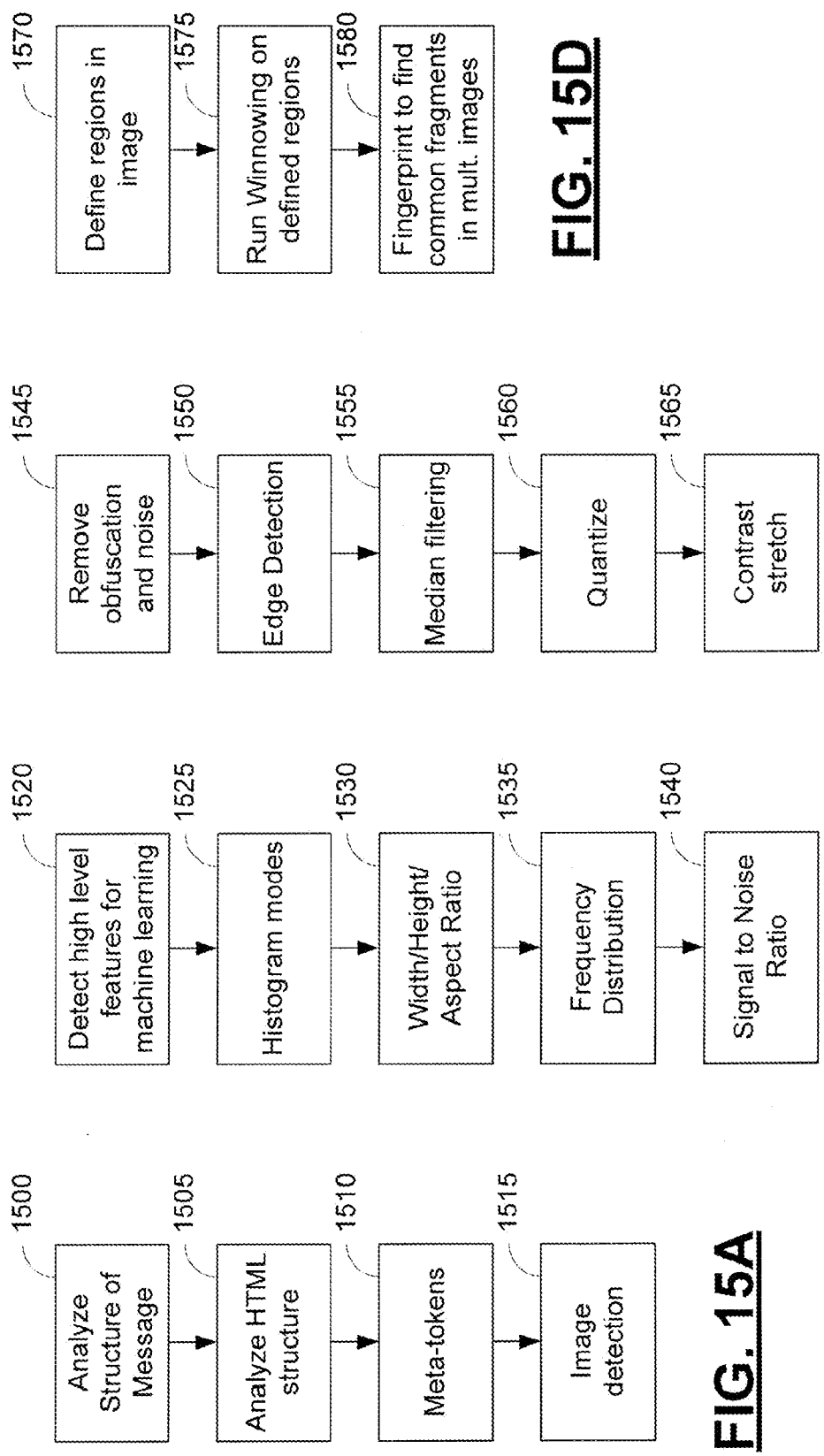

MULTI-DIMENSIONAL REPUTATION SCORING

CROSS-REFERENCE

This application incorporates by reference, in their entirety and for all purposes, commonly assigned U.S. Patent Applications:

| Application No. | Title | Filing Date |
|---|---|---|
| 10/094,211 | "Systems and Methods for Enhancing Electronic Communication Security" | Mar. 8, 2002 |
| 10/361,067 | "Systems and Methods for Automated Whitelisting in Monitored Communications" | Feb. 7, 2003 |
| 10/373,325 | "Systems and Methods for Upstream Threat Pushback" | Feb. 24, 2003 |
| 10/384,924 | "Systems and Methods for Secure Communication Delivery" | Mar. 6, 2003 |
| 11/173,941 | "Message Profiling Systems and Methods" | Jun. 2, 2005 |
| 11/142,943 | "Systems and Methods for Classification of Messaging Entities" | Jun. 2, 2005 |
| 11/388,575 | "Systems and Methods for Message Threat Management" | Mar. 24, 2006 |
| 11/456,803 | "Systems And Methods For Adaptive Message Interrogation Through Multiple Queues" | Jul. 11, 2006 |
| 11/456,765 | "Systems and Methods For Anomaly Detection in Patterns of Monitored Communications" | Jul. 11, 2006 |
| 11/423,313 | "Systems and Methods for Identifying Potentially Malicious Messages" | Jun. 9, 2006 |
| 11/456,954 | "Systems and Methods For Message Threat Management" | Jul. 12, 2006 |
| 11/456,960 | "Systems and Methods For Message Threat Management" | Jul. 12, 2006 |
| 11/423,308 | "Systems and Methods for Graphically Displaying Messaging Traffic" | Jun. 9, 2006 |
| 11/383,347 | "Content-Based Policy Compliance Systems and Methods" | May 15, 2006 |
| 11/423,329 | "Methods and Systems for Exposing Messaging Reputation to an End User" | Jun. 9, 2006 |

This application incorporates by reference, in their entirety and for all purposes, commonly assigned U.S. Patents:

| U.S. Pat. No. | Title | Filing Date |
|---|---|---|
| 6,941,467 | "Systems and Methods for Adaptive Message Interrogation through Multiple Queues" | Mar. 8, 2002 |
| 7,089,590 | "Systems and Methods for Adaptive Message Interrogation through Multiple Queues" | Sep. 2, 2005 |
| 7,096,498 | "Systems and Methods for Message Threat Management" | Feb. 7, 2003 |
| 7,124,438 | "Systems and Methods for Anomaly Detection in Patterns of Monitored Communications" | Mar. 8, 2002 |

TECHNICAL FIELD

This document relates generally to systems and methods for processing communications and more particularly to systems and methods for classifying entities associated with communications.

BACKGROUND

In the anti-spam industry, spammers use various creative means for evading detection by spam filters. As such, the entity from which a communication originated can provide another indication of whether a given communication should be allowed into an enterprise network environment.

However, current tools for message sender analysis include internet protocol (IP) blacklists (sometimes called real-time blacklists (RBLs)) and IP whitelists (real-time whitelists (RWLs)). Whitelists and blacklists certainly add value to the spam classification process; however, whitelists and blacklists are inherently limited to providing a binary-type (YES/NO) response to each query. Moreover, blacklists and whitelists treat entities independently, and overlook the evidence provided by various attributes associated with the entities.

SUMMARY

Systems and methods for a distributed reputation architecture are provided. A distributed reputation system can include a communications interface, a data aggregation engine, an analyzer, a correlation engine and a reputation engine. The communications interface can communicate with a plurality of agents arranged within a global network. The data aggregation engine can aggregate the collected data via the communications interface. The analyzer can analyze the data to identify attributes respectively associated with entities originating the received communications. The correlation engine can correlate the attributes of the entities and to identify relationships between the entities. The reputation engine can identify relationships between the entities and to update reputations associated with one or more entities based upon its relationship to one or more other entities. The communications interface can also to communicate updated reputation information to devices operating on the global network.

Other systems operable to derive and assign reputations can include a communications interface, a data aggregation engine, an analyzer, a correlation engine, a reputation engine and a traffic control engine. The communications interface can receive information from agents or a central server within a global network. The data aggregation engine can aggregate the received information from the communications interface. The analyzer can analyze the received information to identify attributes respectively associated with entities originating the received communications. The correlation engine can correlate the attributes of the entities and identify relationships between the entities. The reputation engine can identify relationships between the entities and to update reputations associated with one or more entities based upon its relationship to one or more other entities, The traffic control engine can determine handling associated with a communication based upon the updated reputations.

Methods of assigning reputation to communications entities can include: arranging a plurality of agents within a network, the plurality of agents being associated with a security device operable to protect an associated network from communications that violate a policy associated with the associated network; collecting data associated with entities originating communications, wherein collecting data comprises using the plurality of agents to collect data associated with the communications; aggregating the collected data; analyzing the aggregated data to identify attributes respectively associated with entities originating communications; correlating the attributes to identify relationships between entities; updating a reputation associated with one or more entities based upon the relationship to one or more other entities identified by correlating the attributes; and, communicating updated reputation information to one or more of the plurality of agents.

Methods of assigning reputation to a communications entity can include: collecting data associated with entities originating communications, wherein collecting data comprises receiving data from a plurality of agents to collect data associated with the communications; aggregating the collected data; analyzing the aggregated data to identify attributes respectively associated with entities originating communications; correlating the attributes to identify relationships between entities; updating a reputation associated with one or more entities based upon the relationship to one or more other entities identified by correlating the attributes; and, handling, communications based upon the updated reputation information.

DESCRIPTION OF DRAWINGS

FIG. 15A is a flowchart illustrating an operational scenario for analyzing the structure of a communication.

FIG. 15B is a flowchart illustrating an operational scenario for analyzing the features of an image.

FIG. 15C is a flowchart illustrating an operational scenario for normalizing the an image for spam processing.

FIG. 15D is a flowchart illustrating an operational scenario for analyzing the fingerprint of an image to find common fragments among multiple images.

DETAILED DESCRIPTION

Figure 1:
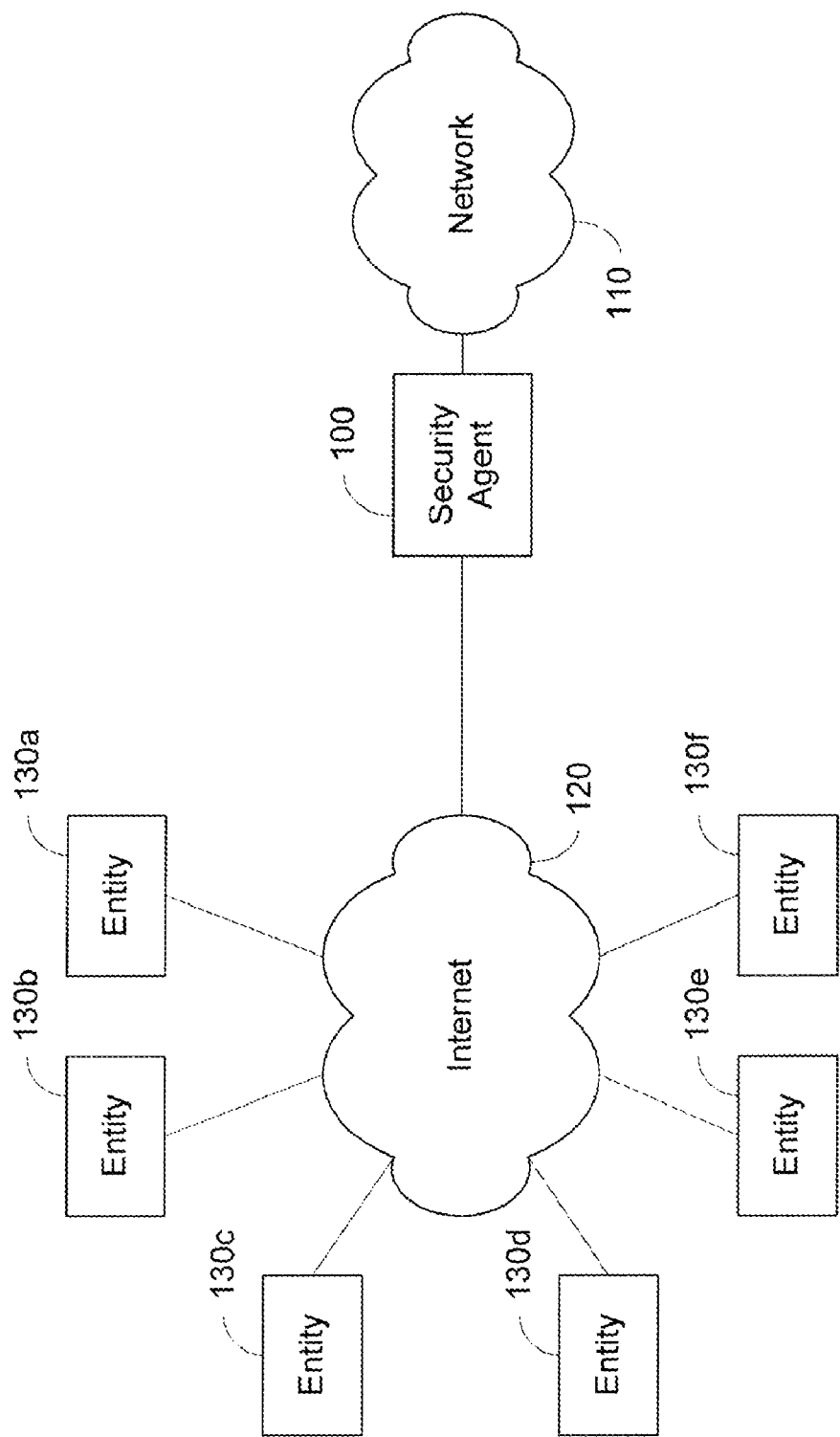
FIG. 1 is a block diagram depicting an example network in which systems and methods of this disclosure can operate.

FIG. 1 is a block diagram depicting an example network environment in which systems and methods of this disclosure can operate. Security agent 110 0 can typically reside between a firewall system (not shown) and servers (not shown) internal to a network 110 (e.g., an enterprise network). As should be understood, the network 110 can include a number of servers, including, for example, electronic mail servers, web servers, and various application servers as may be used by the enterprise associated with the network 110.

The security agent 100 monitors communications entering and exiting the network 110. These communications are typically received though the internet 120 from many entities 130*a-f* that are connected to the internet 120. One or more of the entities 130*a-f* can be legitimate originators of communications traffic. However, one or more of the entities 130*a-f* can also be non-reputable entities originating unwanted communications. As such, the security agent 100 includes a reputation engine. The reputation engine can inspect a communication and to determine a reputation associated with an entity that originated the communication. The security agent 100 then performs an action on the communication based upon the reputation of the originating entity. If the reputation indicates that the originator of the communication is reputable, for example, the security agent can forward the communication to the recipient of the communication. However, if the reputation indicates that the originator of the communication is non-reputable, for example, the security agent can quarantine the communication, perform more tests on the message, or require authentication from the message originator, among many others. Reputation engines are described in detail in United States Patent Publication No. 2006/0015942, which is hereby incorporated by reference.

Figure 2:
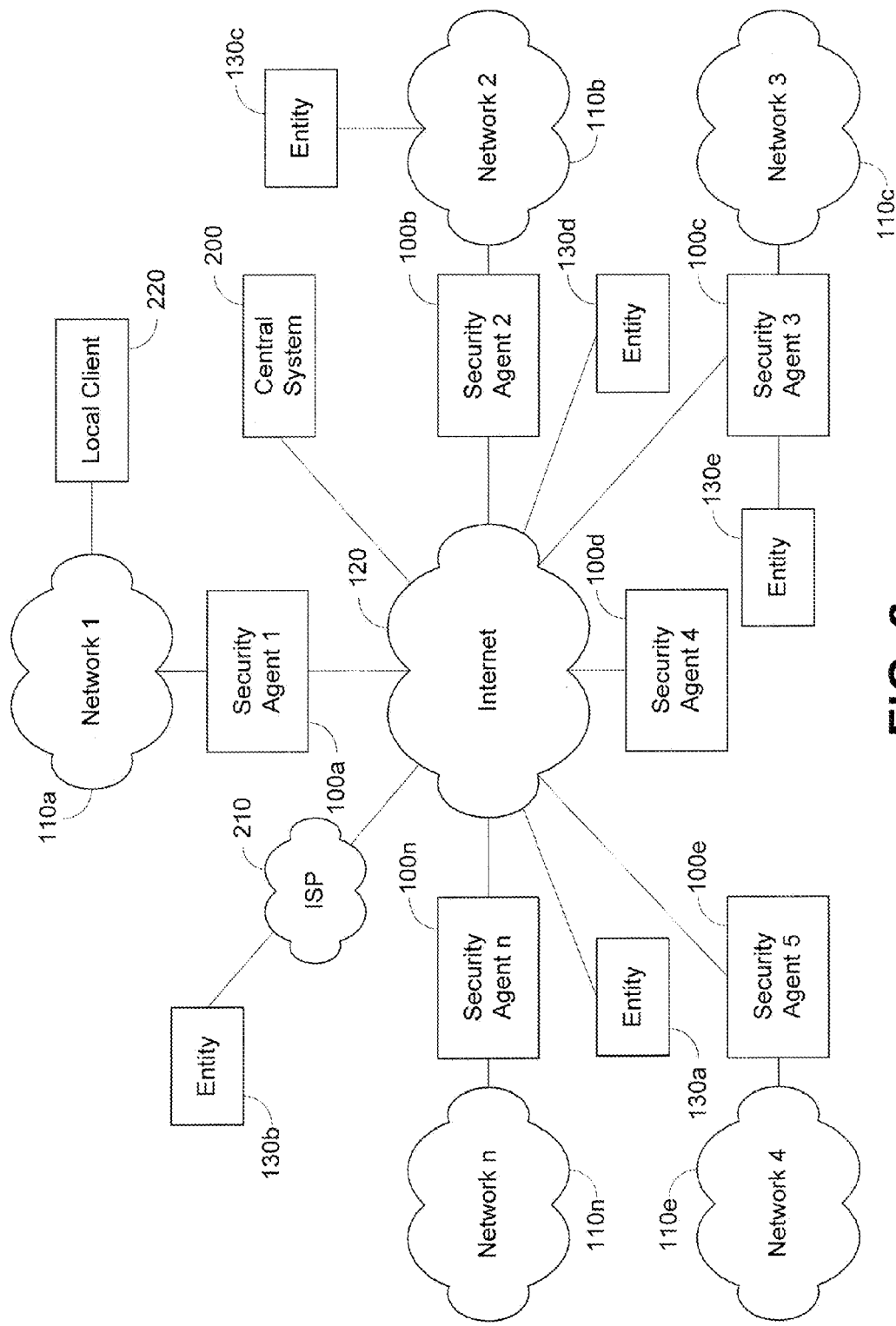
FIG. 2 is a block diagram depicting an example network architecture of this disclosure.

FIG. 2 is a block diagram depicting an example network architecture of this disclosure. Security agents 100*a-n* are shown logically residing between networks 110*a-n*, respectively, and the internet 120. While not shown in FIG. 2, it should be understood that a firewall may be installed between the security agents 100*a-n* and the internet 120 to provide protection from unauthorized communications from entering the respective networks 110*a-n*. Moreover, intrusion detection systems (IDS) (not shown) can be deployed in conjunction with firewall systems to identify suspicious patterns of activity and to signal alerts when such activity is identified.

While such systems provide some protection for a network they typically do not address application level security threats. For example, hackers often attempt to use various network-type applications (e.g., e-mail, web, instant messaging (IM) etc.) to create a pre-textual connection with the networks 110*a-n* in order to exploit security holes created by these various applications using entities 130*a-e*. However, not all entities 130*a-e* imply threats to the network 110*a-n*. Some entities 130*a-e* originate legitimate traffic, allowing the employees of a company to communicate with business associates more efficiently. While examining the communications for potential threats is useful, it can be difficult to maintain current threat information because attacks are being continually modified to account for the latest filtering techniques. Thus, security agents 100*a-n* can run multiple tests on a communication to determine whether the communication is legitimate.

Furthermore, sender information included in the communication can be used to help determine whether or not a communication is legitimate. As such, sophisticated security agents 100*a-n* can track entities and analyze the characteristics of the entities to help determine whether to allow a communication to enter a network 110*a-n*. The entities 110*a-n* can then be assigned a reputation. Decisions on a communication can take into account the reputation of an entity 130*a-e* that originated the communication. Moreover, one or more central systems 200 can collect information on entities 120*a-e* and distribute the collected data to other central systems 200 and/or the security agents 100*a-n*.

Reputation engines can assist in identifying the bulk of the malicious communications without extensive and potentially costly local analysis of the content of the communication. Reputation engines can also help to identify legitimate communications and prioritize their delivery and reduce the risk of misclassifying a legitimate communication. Moreover, reputation engines can provide a dynamic and predictive approaches to the problem of identifying malicious, as well as legitimate, transactions in physical or virtual worlds. Examples include the process of filtering malicious communications in an email, instant messaging, VoIP, SMS or other communication protocol system using analysis of the reputation of sender and content. A security agent 100*a-n* can then apply a global or local policy to determine what action to perform with respect to the communication (such as deny, quarantine, load balance, deliver with assigned priority, analyze locally with additional scrutiny) to the reputation result.

However, the entities 130*a-e* can connect to the internet in a variety of methods. As should be understood, an entity 130*a-e* can have multiple identifiers (such as, for example, e-mail addresses, IP addresses, identifier documentation, etc) at the same time or over a period of time. For example, a mail server with changing IP addresses can have multiple identities over time. Moreover, one identifier can be associated with multiple entities, such as, for example, when an IP address is shared by an organization with many users behind it. Moreover, the specific method used to connect to the internet can obscure the identification of the entity 130*a-e*. For example, an entity 130*b* may connect to the internet using an internet service provider (ISP) 200. Many ISPs 200 use dynamic host configuration protocol (DHCP) to assign IP addresses dynamically to entities 130*b* requesting a connection. Entities 130*a-e* can also disguise their identity by spoofing a legitimate entity. Thus, collecting data on the characteristics of each entity 130*a-e* can help to categorize an entity 130*a-e* and determine how to handle a communication.

The ease of creation and spoofing of identities in both virtual and physical world can create an incentive for users to act maliciously without bearing the consequences of that act. For example, a stolen IP address on the Internet (or a stolen passport in the physical world) of a legitimate entity by a criminal can enable that criminal to participate in malicious activity with relative ease by assuming the stolen identity. However, by assigning a reputation to the physical and virtual entities and recognizing the multiple identities that they can employ, reputation systems can influence reputable and non-reputable entities to operate responsibly for fear of becoming non-reputable, and being unable to correspond or interact with other network entities.

Figure 3:
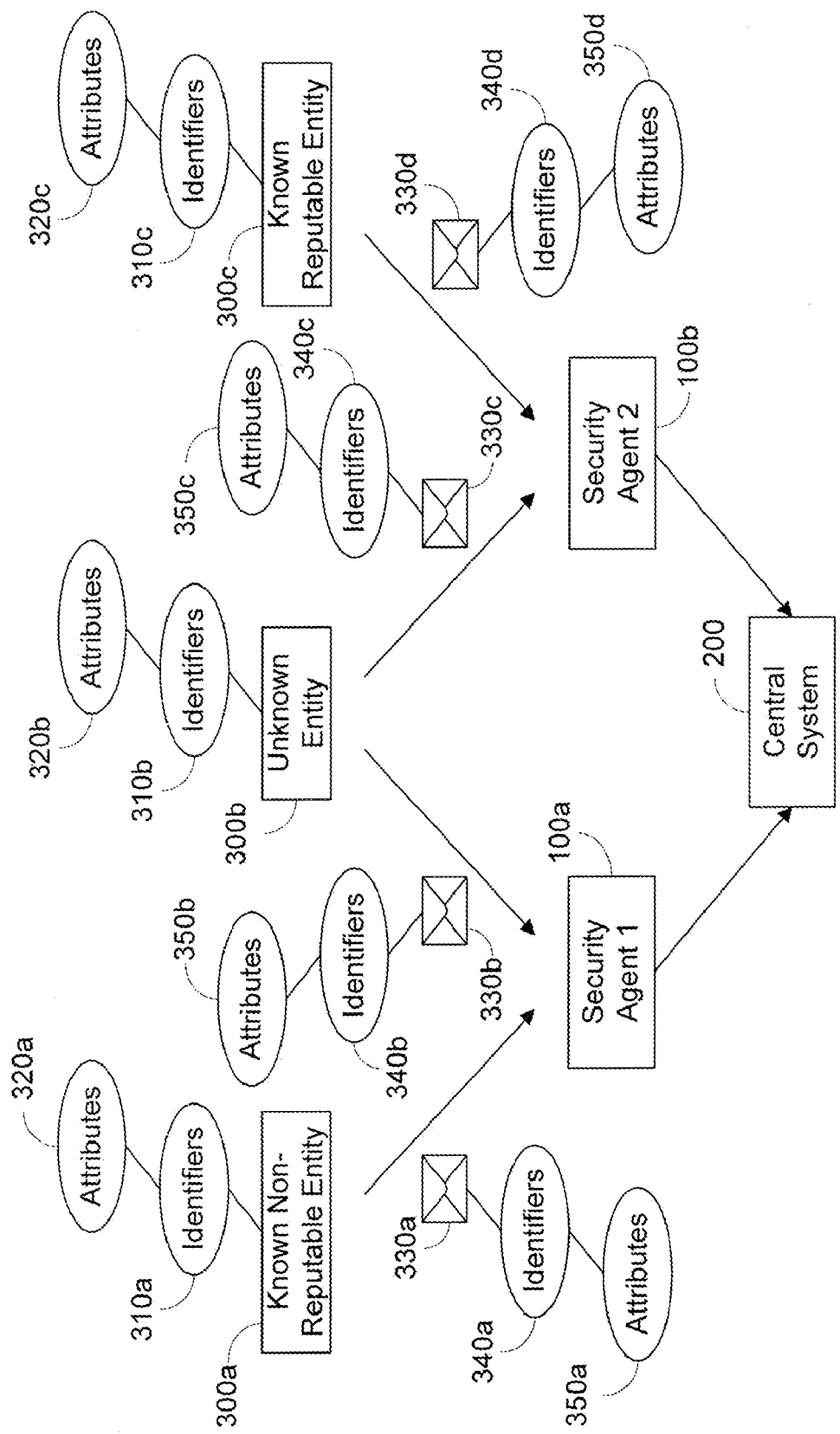
FIG. 3 is a block diagram depicting an example of communications and entities including identifiers and attributes used to detect relationships between entities.

FIG. 3 is a block diagram depicting an example of communications and entities including using identifiers and attributes used to detect relationships between entities. Security agents 100*a-b* can collect data by examining communications that are directed to an associated network. Security agents 100*a-b* can also collect data by examining communications that are relayed by an associated network. Examination and analysis of communications can allow the security agents 100*a-b* to collect information about the entities 300*a-c* sending and receiving messages, including, transmission patterns, volume, or whether the entity has a tendency to send certain kinds of message (e.g., legitimate messages, spam, virus, bulk mail, etc.), among many others.

As shown in FIG. 3, each of the entities 300*a-c* is associated with one or more identifiers 310*a-c*, respectively. The identifiers 310*a-c* can include, for example, IP addresses, universal resource locator (URL), phone number, IM username, message content, domain, or any other identifier that might describe an entity. Moreover, the identifiers 310*a-c* are associated with one or more attributes 320*a-c*. As should be understood, the attributes 320*a-c* are fitted to the particular identifier 310*a-c* that is being described. For example, a message content identifier could include attributes such as, for example, malware, volume, type of content, behavior, etc. Similarly, attributes 320*a-c* associated with an identifier, such as IP address, could include one or more IP addresses associated with an entity 300*a-c*.

Furthermore, it should be understood that this data can be collected from communications 330*a-c* (e.g., e-mail) typically include some identifiers and attributes of the entity that originated the communication. Thus, the communications 330*a-c* provide a transport for communicating information about the entity to the security agents 100*a*, 100*b*. These attributes can be detected by the security agents 100*a*, 100*b* through examination of the header information included in the message, analysis of the content of the message, as well as through aggregation of information previously collected by the security agents 100*a*, 100*b* (e.g., totaling the volume of communication is received from an entity).

The data from multiple security agents 100*a*, 100*b* can be aggregated and mined. For example, the data can be aggregated and mined by a central system which receives identifiers and attributes associated with all entities 300*a-c* for which the security agents 100*a*, 100*b* have received communications. Alternatively, the security agents 100*a*, 100*b* can operate as a distributed system, communicating identifier and attribute information about entities 300*a-c* with each other. The process of mining the data can correlate the attributes of entities 300*a-c* with each other, thereby determining relationships between entities 300a-c (such as, for example, correlations between an event occurrence, volume, and/or other determining factors).

These relationships can then be used to establish a multi-dimensional reputation "vector" for all identifiers based on the correlation of attributes that have been associated with each identifier. For example, if a non-reputable entity 300a with a known reputation for being non-reputable sends a message 330a with a first set of attributes 350a, and then an unknown entity 300b sends a message 330b with a second set of attributes 350b, the security agent 100a can determine whether all or a portion of the first set of attributes 350a matched all or a portion of the second set of attributes 350b. When some portion of the first set of attributes 350a matches some portion of the second set of attributes 330b, a relationship can be created depending upon the particular identifier 320a. 320b that included the matching attributes 330a, 330b. The particular identifiers 340a, 340b which are found to have matching attributes can be used to determine a strength associated with the relationship between the entities 300a, 300b. The strength of the relationship can help to determine how much of the non-reputable qualities of the non-reputable entity 300a are attributed to the reputation of the unknown entity 300b.

However, it should also be recognized that the unknown entity 300b may originate a communication 330c which includes attributes 350c that match some attributes 350d of a communication 330d originating from a known reputable entity 300c. The particular identifiers 340c, 340d which are found to have matching attributes can be used to determine a strength associated with the relationship between the entities 300b, 300c. The strength of the relationship can help to determine how much of the reputable qualities of reputable entity 300c are attributed to the reputation of the unknown entity 300b.

A distributed reputation engine also allows for real-time collaborative sharing of global intelligence about the latest threat landscape, providing instant protection benefits to the local analysis that can be performed by a filtering or risk analysis system, as well as identify malicious sources of potential new threats before they even occur. Using sensors positioned at many different geographical locations information about new threats can be quickly and shared with the central system 200, or with the distributed security agents 100a, 100b. As should be understood, such distributed sensors can include the local security agents 100a, 100b, as well as local reputation clients, traffic monitors, or any other device suitable for collecting communication data (e.g., switches, routers, servers, etc.).

For example, security agents 100a, 100b can communicate with a central system 200 to provide sharing of threat and reputation information. Alternatively, the security agents 100a, 100b can communicate threat and reputation information between each other to provide up to date and accurate threat information. In the example of FIG. 3, the first security agent 100a has information about the relationship between the unknown entity 300b and the non-reputable entity 300a, while the second security agent 100b has information about the relationship between the unknown entity 300b and the reputable entity 300c Without sharing the information, the first security agent 100a may take a particular action on the communication based upon the detected relationship. However, with the knowledge of the relationship between the unknown entity 300b and the reputable entity 300c, the first security agent 100a might take a different action with a received communication from the unknown entity 300b. Sharing of the relationship information between security agents, thus provides for a more complete set of relationship information upon which a determination will be made.

The system attempts to assign reputations (reflecting a general disposition and/or categorization) to physical entities, such as individuals or automated systems performing transactions. In the virtual world, entities are represented by identifiers (ex. IPs, URLs, content) that are tied to those entities in the specific transactions (such as sending a message or transferring money out of a bank account) that the entities are performing. Reputation can thus be assigned to those identifiers based on their overall behavioral and historical patterns as well as their relationship to other identifiers, such as the relationship of IPs sending messages and URLs included in those messages. A "bad" reputation for a single identifier can cause the reputation of other neighboring identifiers to worsen, if there is a strong correlation between the identifiers. For example, an IP that is sending URLs which have a bad reputation will worsen its own reputation because of the reputation of the URLs. Finally, the individual identifier reputations can be aggregated into a single reputation (risk score) for the entity that is associated with those identifiers It should be noted that attributes can fall into a number of categories. For example, evidentiary attributes can represent physical, digital, or digitized physical data about an entity. This data can be attributed to a single known or unknown entity, or shared between multiple entities (forming entity relationships). Examples of evidentially attributes relevant to messaging security include IP (internet protocol) address, known domain names, URLs, digital fingerprints or signatures used by the entity, TCP signatures, and etcetera.

As another example, behavioral attributes can represent human or machine-assigned observations about either an entity or an evidentiary attribute. Such attributes may include one, many, or all attributes from one or more behavioral profiles. For example, a behavioral attribute generically associated with a spammer may by a high volume of communications being sent from that entity.

A number of behavioral attributes for a particular type of behavior can be combined to derive a behavioral profile. A behavioral profile can contain a set of predefined behavioral attributes. The attributive properties assigned to these profiles include behavioral events relevant to defining the disposition of an entity matching the profile. Examples of behavioral profiles relevant to messaging security might include, "Spammer", "Scammer", and "Legitimate Sender". Events and/or evidentiary attributes relevant to each profile define appropriate entities to which a profile should be assigned. This may include a specific set of sending patterns, blacklist events, or specific attributes of the evidentiary data. Some examples include: Sender/Receiver Identification; Time Interval and sending patterns; Severity and disposition of payload; Message construction; Message quality; Protocols and related signatures; Communications medium It should be understood that entities sharing some or all of the same evidentiary attributes have an evidentiary relationship. Similarly, entities sharing behavioral attributes have a behavioral relationship. These relationships help form logical groups of related profiles, which can then be applied adaptively to enhance the profile or identify entities slightly more or less standard with the profiles assigned.

Figure 4:
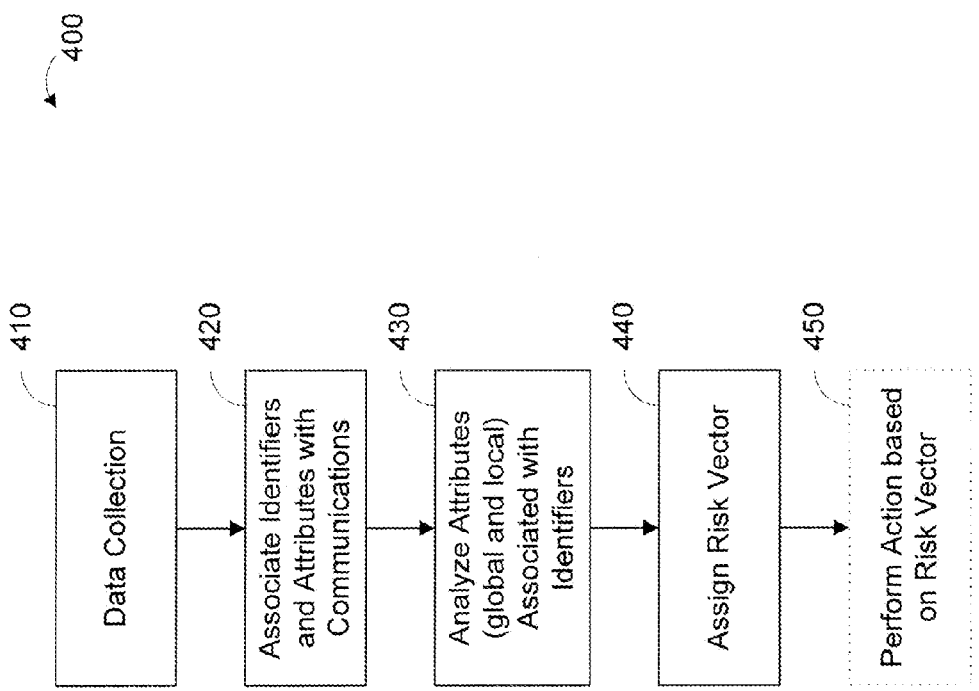
FIG. 4 is a flowchart depicting an operational scenario used to detect relationships and assign risk to entities.

FIG. 4 is a flowchart depicting an operational scenario 400 used to detect relationships and assign risk to entities. The operational scenario begins at step 410 by collecting network data. Data collection can be done, for example, by a security agent 100, a client device, a switch, a router, or any other device operable to receive communications from network entities (e.g., e-mail servers, web servers, IM servers, ISPs, file transfer protocol (FTP) servers, gopher servers, VoIP equipments, etc.).

At step 420 identifiers are associated with the collected data (e.g., communication data). Step 420 can be performed by a security agent 100 or by a central system 200 operable to aggregate data from a number of sensor devices, including, for example, one or more security agents 100. Alternatively, step 420 can be performed by the security agents 100 themselves. The identifiers can be based upon the type of communication received. For example, an e-mail can include one set of information (e.g., IP) address of originator and destination, text content, attachment, etc.), while a VoIP communication can include a different set of information (e.g., originating phone number (or IP address if originating from a VoIP client), receiving phone number (or IP address if destined for a VoIP phone), voice content, etc.). Step 420 can also include assigning the attributes of the communication with the associated identifiers.

At step 430 the attributes associated with the entities are analyzed to determine whether any relationships exist between entities for which communications information has been collected. Step 430 can be performed, for example, by a central system 200 or one or more distributed security agents 100. The analysis can include comparing attributes related to different entities to find relationships between the entities. Moreover, based upon the particular attribute which serves as the basis for the relationship, a strength can be associated with the relationship.

At step 440 a risk vector is assigned to the entities. As an example, the risk vector can be assigned by the central system 200 or by one or more security agents 100. The risk vector assigned to an entity 130 (FIGS. 1-2), 300 (FIG. 3) can be based upon the relationship found between the entities and on the basis of the identifier which formed the basis for the relationship.

Figure 5:
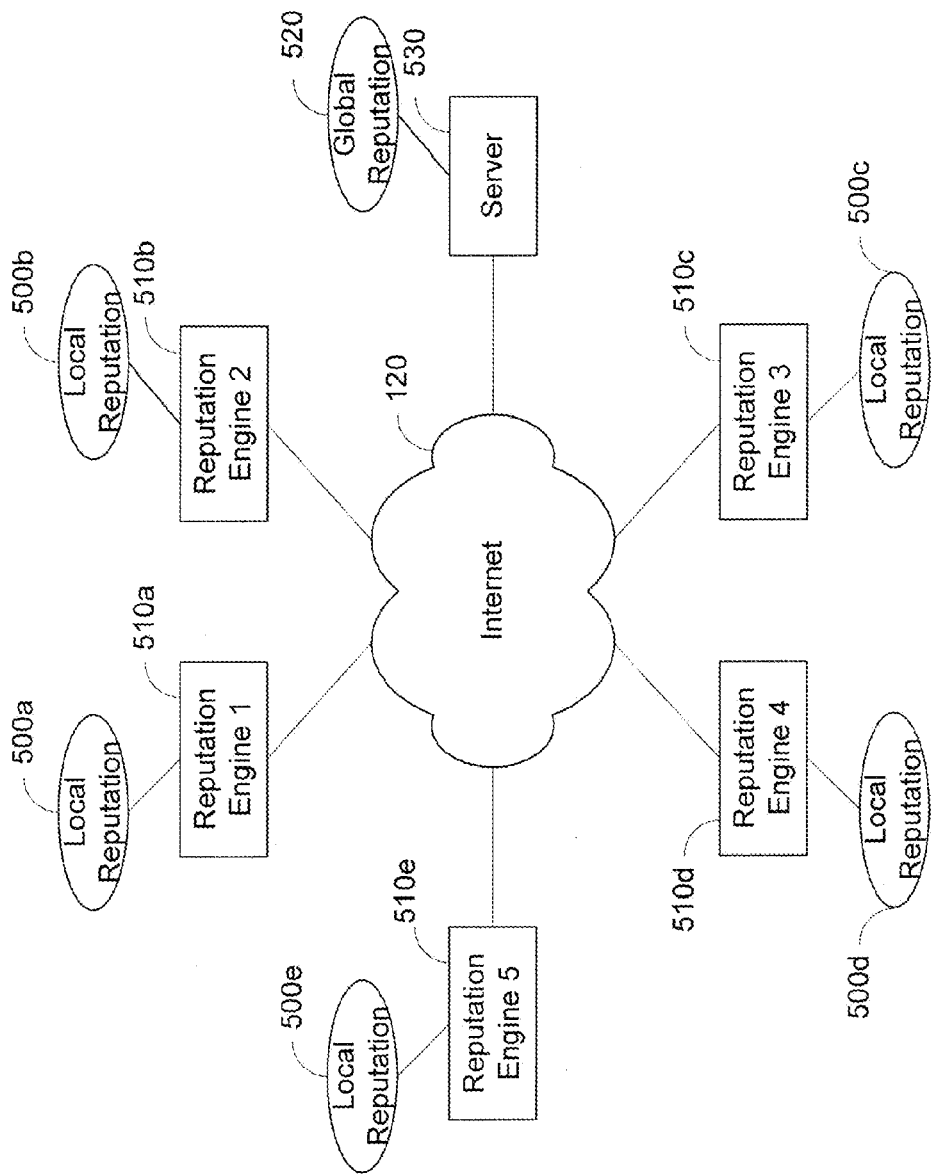
FIG. 5 is a block diagram illustrating an example network architecture including local reputations stored by local security agents and a global reputation stored by one or more servers.

At step 450, an action can be performed based upon the risk vector. The action can be performed, for example, by a security agent 100. The action can be performed on a received communication associated with an entity for which a risk vector has been assigned. The action can include any of allow, deny, quarantine, load balance, deliver with assigned priority, or analyze locally with additional scrutiny, among many others. However, it should be understood that a reputation vector can be derived separately FIG. 5 is a block diagram illustrating an example network architecture including local reputations 500a-e derived by local reputation engines 510a-e and a global reputation 520 stored by one or more servers 530. The local reputation engines 510a-e, for example, can be associated with local security agents such as security agents 100. Alternatively, the local reputation engines 510a-e call be associated, for example, with a local client. Each of the reputation engines 510a-e includes a list of one or more entities for which the reputation engine 510a-c stores a derived reputation 500a-e.

However, these stored derived reputations can be inconsistent between reputation engines, because each of the reputation engines may observe different types of traffic. For example, reputation engine 1 510a may include a reputation that indicates a particular entity is reputable, while reputation engine 2 510b may include a reputation that indicates that the same entity is non-reputable. These local reputational inconsistencies can be based upon different traffic received from the entity. Alternatively, the inconsistencies can be based upon the feedback from a user of local reputation engine 1 510a indicating a communication is legitimate, while a user of local reputation engine 2 510b provides feedback indicating that the same communication is not legitimate.

The server 530 receives reputation information from the local reputation engines 510a-e. However, as noted above, some of the local reputation information may be inconsistent with other local reputation information. The server 530 can arbitrate between the local reputations 500a-e to determine a global reputation 520 based upon the local reputation information 500a-e. In some examples, the global reputation information 520 can then be provided back to the local reputation engines 510a-e to provide these local engines 510a-e with up-to-date reputational information. Alternative, the local reputation engines 510a-e can be operable to query the server 530 for reputation information. In some examples, the server 530 responds to the query with global reputation information 520.

In other examples, the server 530 applies a local reputation bias to the global reputation 520. The local reputation bias can perform a transform on the global reputation to provide the local reputation engines 510a-e with a global reputation vector that is biased based upon the preferences of the particular local reputation engine 510a-e which originated the query. Thus, a local reputation engine 510a with an administrator or user(s) that has indicated a high tolerance for spam messages can receive a global reputation vector that accounts for an indicated tolerance. The particular components of the reputation vector returns to the reputation engine 510a might include portions of the reputation vector that are deemphasized with relationship to the rest of the reputation vector. Likewise, a local reputation engine 510b that has indicated, for example, a low tolerance communications from entities with reputations for originating viruses may receive a reputation vector that amplifies the components of the reputation vector that relate to virus reputation.

Figure 6:
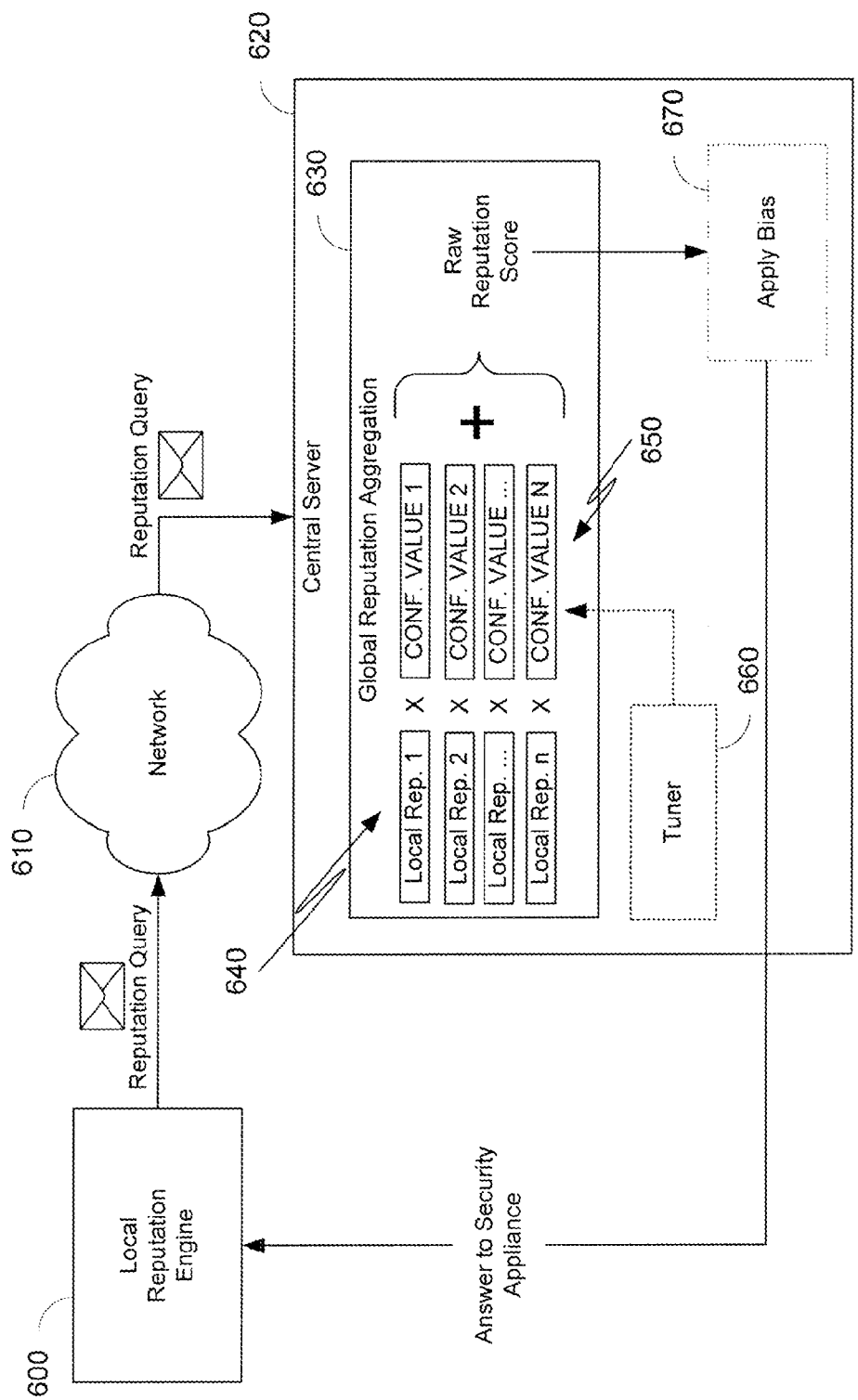
FIG. 6 is a block diagram illustrating a determination of a global reputation based on local reputation feedback.

FIG. 6 is a block diagram illustrating a determination of a global reputation based on local reputation feedback. A local reputation engine 600 is operable to send a query through a network 610 to a server 620. In some examples, the local reputation engine 600 originates a query in response to receiving a communication from an unknown entity. Alternatively, the local reputation engine 600 can originate the query responsive to receiving any communications, thereby promoting use of more up-to-date reputation information.

The server 620 is operable to respond to the query with a global reputation determination. The central server 620 can derive the global reputation using a global reputation aggregation engine 630. The global reputation aggregation engine 630 is operable to receive a plurality of local reputations 640 from a respective plurality of local reputation engines. In some examples, the plurality of local reputations 640 can be periodically sent by the reputation engines to the server 620. Alternatively, the plurality of local reputations 640 can be retrieved by the server upon receiving a query from one of the local reputation engines 600.

The local reputations can be combined using confidence values related to each of the local reputation engines and then accumulating the results. The confidence value can indicate the confidence associated with a local reputation produced by an associated reputation engine. Reputation engines associated with individuals, for example, can receive a lower weighting in the global reputation determination. In contrast, local reputations associated with reputation engines operating on large networks can receive greater weight in the global reputation determination based upon the confidence value associated with that reputation engine.

In some examples, the confidence values 650 can be based upon feedback received from users. For example, a reputation engine that receives a lot of feedback indicating that communications were not properly handled because local reputation information 640 associated with the communication indicated the wrong action can be assigned low confidence values 650 for local reputations 640 associated with those reputation engines. Similarly, reputation engines that receive feedback indicating that the communications were handled correctly based upon local reputation information 640 associated with the communication indicated the correct action can be assigned a high confidence value 650 for local reputations 640 associated with the reputation engine. Adjustment of the confidence values associated with the various reputation engines can be accomplished using a tuner 660, which is operable to receive input information and to adjust the confidence values based upon the received input. In some examples, the confidence values 650 can be provided to the server 620 by the reputation engine itself based upon stored statistics for incorrectly classified entities. In other examples, information used to weight the local reputation information can be communicated to the server 620.

In some examples, a bias 670 can be applied to the resulting global reputation vector. The bias 670 can normalize the reputation vector to provide a normalized global reputation vector to a reputation engine 600. Alternatively, the bias 670 can be applied to account for local preferences associated with the reputation engine 600 originating the reputation query. Thus, a reputation engine 600 can receive a global reputation vector matching the defined preferences of the querying reputation engine 600. The reputation engine 600 can take an action on the communication based upon the global reputation vector received from the server 620.

Figure 7:
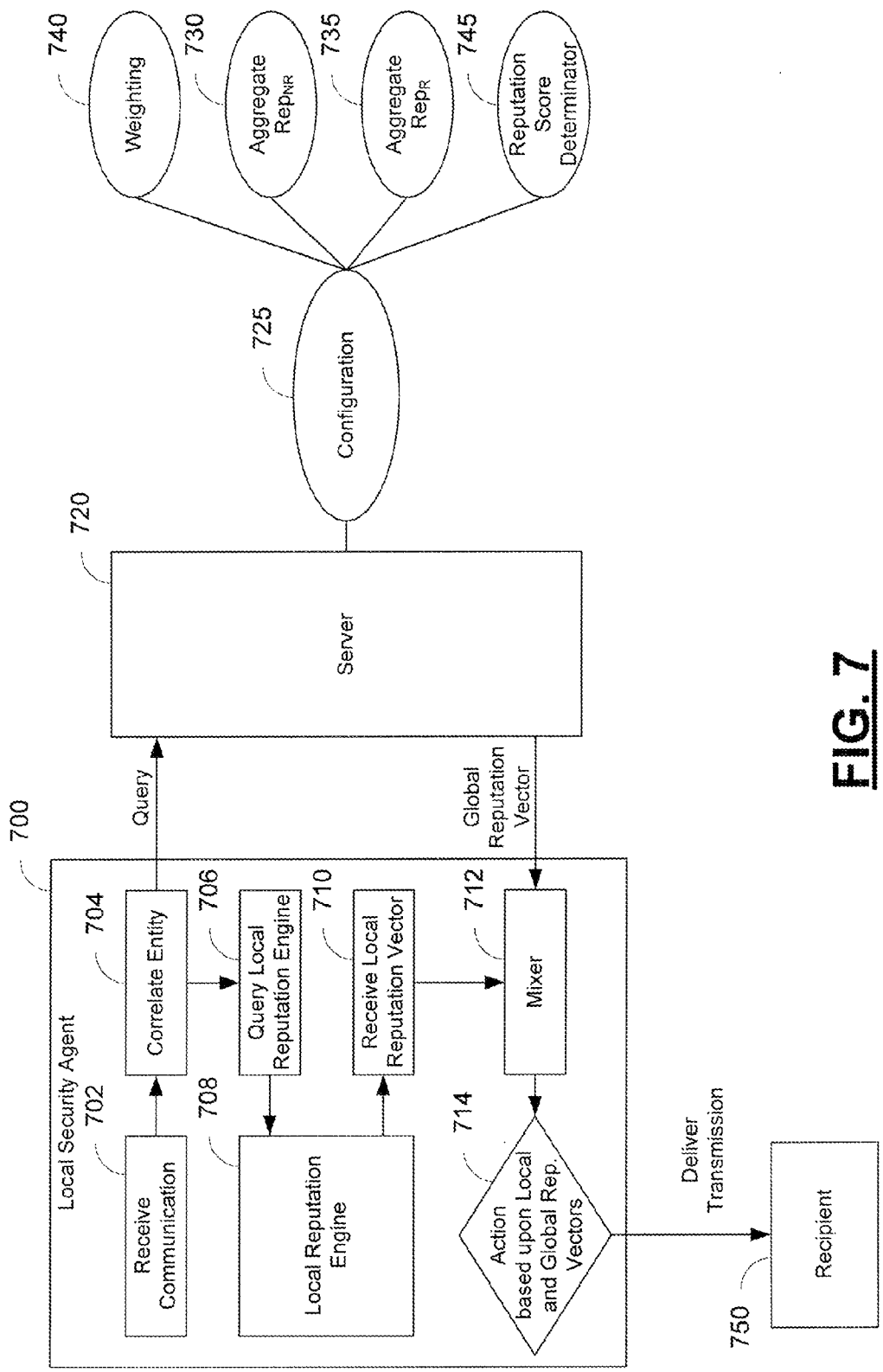
FIG. 7 is a flow diagram illustrating an example resolution between a global reputation and a local reputation.

FIG. 7 is a block diagram illustrating an example resolution between a global reputation and a local reputation. The local security agent 700 communicates with a server 720 to retrieve global reputation information from the server 720. The local security agent 700 can receive a communication at 702. The local security agent can correlate the communication to identity attributes of the message at 704. The attributes of the message can include, for example, an originating entity, a fingerprint of the message content, a message size, etc. The local security agent 700 includes this information in a query to the server 720. In other examples, the local security agent 700 can forward the entire message to the server 720, and the server can perform the correlation and analysis of the message.

The server 720 uses the information received from the query to determine a global reputation based upon a configuration 725 of the server 720. The configuration 725 can include a plurality of reputation information, including both information indicating that a queried entity is non-reputable 730 and information indicating that a queried entity is reputable 735. The configuration 725 can also apply a weighting 740 to each of the aggregated reputations 730, 735. A reputation score determinator 745 can provide the engine for weighting 740 the aggregated reputation information 730, 735 and producing a global reputation vector.

The local security agent 700 then sends a query to a local reputation engine at 706. The local reputation engine 708 performs a determination of the local reputation and returns a local reputation vector at 710. The local security agent 700 also receives a response to the reputation query sent to the server 720 in the form of a global reputation vector. The local security agent 700 then mixes the local and global reputation vectors together at 712. An action is then taken with respect to the received message at 714.

Figure 8:
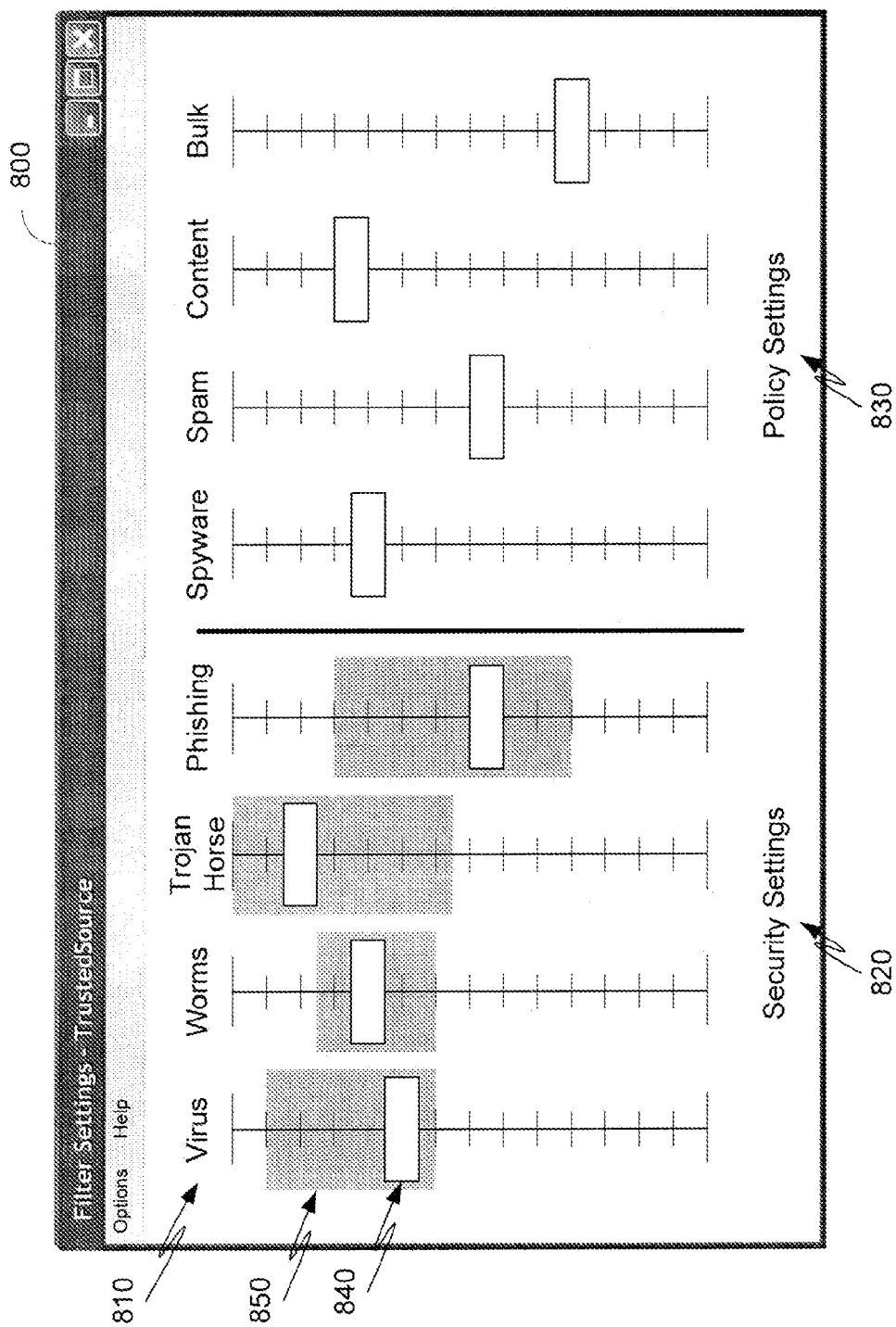
FIG. 8 is an example graphical user interface for adjusting the settings of a filter associated with a reputation server.

FIG. 8 is an example graphical user interface 800 for adjusting the settings of a filter associated with a reputation server. The graphical user interface 800 can allow the user of a local security agent to adjust the settings of a local filter in several different categories 810, such as, for example, "Virus," "Worms," "Trojan Horse," "Phishing," "Spyware," "Spam," "Content," and "Bulk." However, it should be understood that the categories 810 depicted are merely examples, and that the disclosure is not limited to the categories 810 chosen as examples here.

In some examples, the categories 810 can be divided into two or more types of categories. For example, the categories 810 of FIG. 8 are divided into a "Security Settings" type 820 of category 810, and a "Policy Settings" type 830 of category. In each of the categories 810 and types 820, 830, a mixer bar representation 840 can allow the user to adjust the particular filter setting associated with the respective category 810 of communications or entity reputations.

Moreover, while categories 810 of "Policy Settings" type 830 can be adjusted freely based upon the user's own judgment, categories of "Security Settings" type 820 can be limited to adjustment within a range. This distinction can be made in order to prevent a user from altering the security settings of the security agent beyond an acceptable range. For example, a disgruntled employee could attempt to lower the security settings, thereby leaving an enterprise network vulnerable to attack. Thus, the ranges 850 placed on categories 810 in the "Security Settings" type 820 are operable to keep security at a minimum level to prevent the network from being compromised. However, as should be noted, the "Policy Settings" type 830 categories 810 are those types of categories 810 that would not compromise the security of a network, but might only inconvenience the user or the enterprise if the settings were lowered.

Furthermore, it should be recognized that in various examples, range limits 850 can be placed upon all of the categories 810. Thus, the local security agent would prevent users from setting the mixer bar representation 840 outside of the provided range 850. It should also be noted, that in some examples, the ranges may not be shown on the graphical user interface 800. Instead, the range 850 would be abstracted out of the graphical user interface 800 and all of the settings would be relative settings. Thus, the category 810 could display and appear to allow a full range of settings, while transforming the setting into a setting within the provided range. For example, the "Virus" category 810 range 850 is provided in this example as being between level markers 8 and 13. If the graphical user interface 800 were set to abstract the allowable range 850 out of the graphical user interface 800, the "Virus" category 810 would allow setting of the mixer bar representation 840 anywhere between 0 and 14. However, the graphical user interface 800 could transform the 0-14 setting to a setting within the 8 to 13 range 850. Thus, if a user requested a setting of midway between 0 and 14, the graphical user interface could transform that setting into a settings of midway between 8 and 13.

Figure 9:
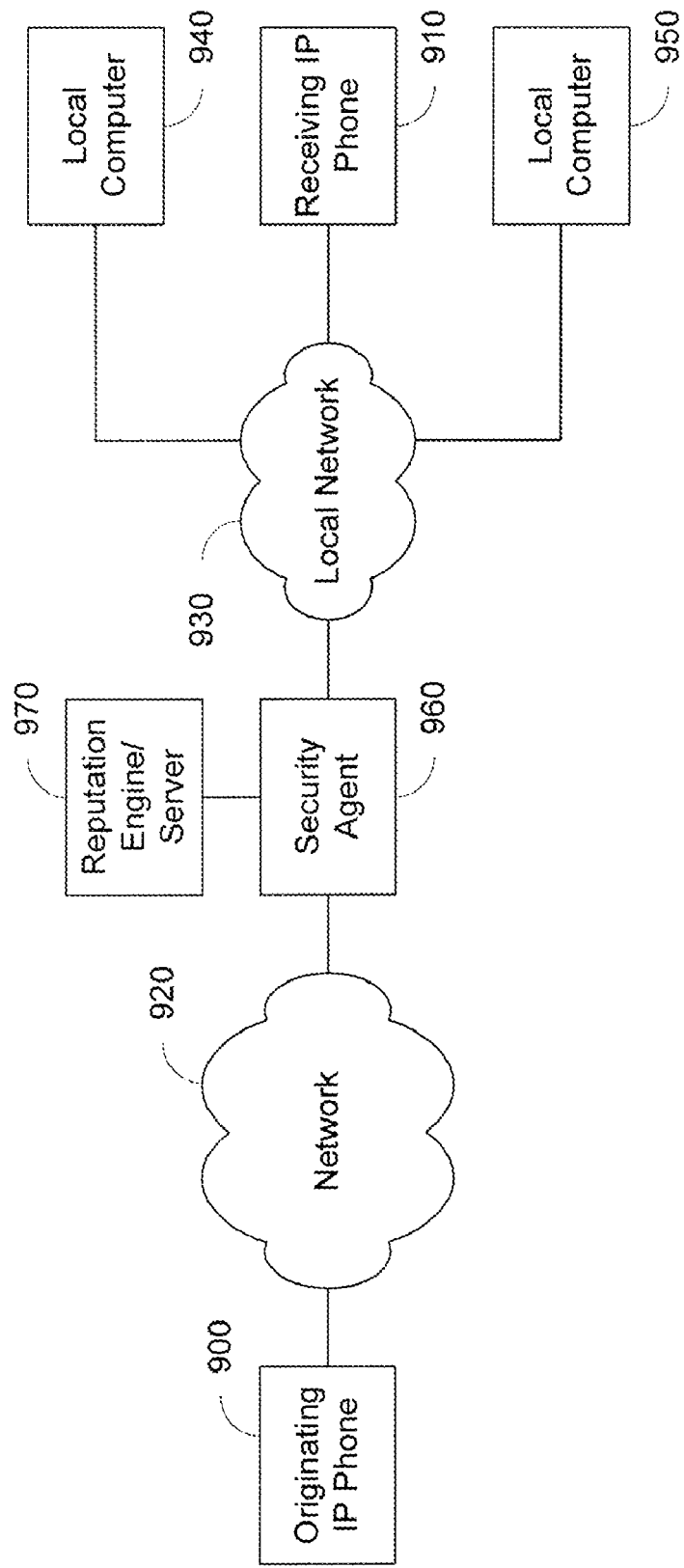
FIG. 9 is a block diagram illustrating reputation based connection throttling for voice over internet protocol (VoIP) or short message service (SMS) communications.

FIG. 9 is a block diagram illustrating reputation based connection throttling for voice over internet protocol (VoIP) or short message service (SMS) communications. As should be understood, an originating IP phone 900 can place a VoIP call to a receiving IP phone 910. These IP phones 900, 910 can be, for example, computers executing soft-phone software, network enabled phones, etc. The originating IP phone 900 can place a VoIP call through a network 920 (e.g., the internet). The receiving IP phone 910 can receive the VoIP call through a local network 930 (e.g., an enterprise network).

Upon establishing a VoIP call, the originating IP phone has established a connection to the local network 930. This connection can be exploited similarly to the way e-mail, web, instant messaging, or other internet applications can be exploited for providing unregulated connect to a network. Thus, a connection to a receiving IP phone can be exploited, thereby putting computers 940, 950 operating on the local network 930 at risk for intrusion, viruses, trojan horses, worms, and various other types of attacks based upon the established connection. Moreover, because of the time sensitive nature of VoIP communications, these communications are typically not examined to ensure that the connection is not being misused. For example, voice conversations occur in real-time. If a few packets of a voice conversation are delayed, the conversation becomes stilted and difficult to understand. Thus, the contents of the packets typically cannot be examined once a connection is established.

However, a local security agent 960 can use reputation information received from a reputation engine or server 970 to determine a reputation associated with the originating IP phone. The local security agent 960 can use the reputation of the originating entity to determine whether to allow a connection to the originating entity. Thus, the security agent 960 can prevent connections to non-reputable entities, as indicated by reputations that do not comply with the policy of the local security agent 960.

In some examples, the local security agent 960 can include a connection throttling engine operable to control the flow rate of packets being transmitted using the connection established between the originating IP phone 900 and the receiving IP phone 910. Thus, an originating entities 900 with a non-reputable reputation can be allowed to make a connection to the receiving IP phone 910. However, the packet throughput will be capped, thereby preventing the originating entity 900 from exploiting the connection to attack the local network 930. Alternatively, the throttling of the connection can be accomplished by performing a detailed inspection of any packets originating from non-reputable entities. As discussed above, the detailed inspection of all VoIP packets is not efficient. Thus, quality of service (QoS) can be maximized for connections associated with reputable entities, while reducing the QoS associated with connections to non-reputable entities. Standard communication interrogation techniques call be performed on connections associated with non-reputable entities in order to discover whether any of the transmitted packets received from the originating entity comprise a threat to the network 930. Various interrogation techniques and systems are described in U.S. Pat. Nos. 6,941,467, 7,089, 590, 7,096,498, and 7,124,438 and in U.S. Patent Application Nos. 2006/0015942, 2006/0015563, 2003/0172302, 2003/0172294, 2003/0172291, and 2003/0172166, which are hereby incorporated by reference.

Figure 10:
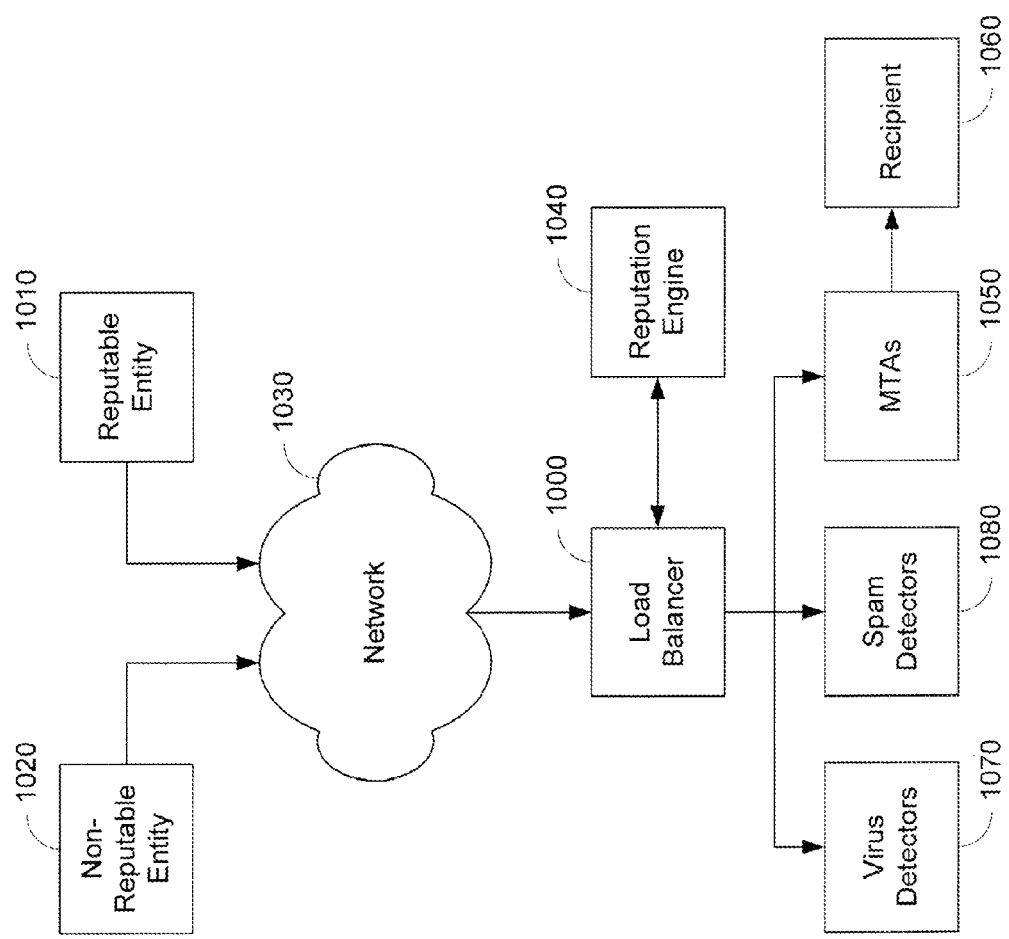
FIG. 10 is a block diagram illustrating a reputation based load balancer.

FIG. 10 is a block diagram illustrating an operation of a reputation based load balancer 1000. The load balancer 1000 is operable to receive communications from reputable and non-reputable entities 1010, 1020 (respectively) through a network 1030 (e.g. the internet). The load balancer 1000 communicates with a reputation engine 1040 to determine the reputation of entities 1010, 1020 associated with incoming or outgoing communications.

The reputation engine 1030 is operable to provide the load balancer with a reputation vector. The reputation vector can indicate the reputation of the entity 1010, 1020 associated with the communication in a variety of different categories. For example, the reputation vector might indicate a good reputation for an entity 1010, 1020 with respect to the entity 1010, 1020 originating spam, while also indicating a poor reputation for the same entity 1010, 1020 with respect to that entity 1010, 1020 originating viruses.

The load balancer 1000 can use the reputation vector to determine what action to perform with respect to a communication associated with that entity 1010, 1020. In situations where a reputable entity 1010) is associated with the communication, the message is sent to a message transfer agent (MTA) 1050 and delivered to a recipient 1060.

In situations where a non-reputable entity 1020 has a reputation for viruses, but does not have a reputation for other types of non-reputable activity, the communication is forwarded to one of a plurality of virus detectors 1070. The load balancer 1000 is operable to determine which of the plurality of virus detectors 1070 to use based upon the current capacity of the virus detectors and the reputation of the originating entity. For example, the load balancer 1000 could send the communication to the least utilized virus detector. In other examples, the load balancer 1000 might determine a degree of non-reputability associated with the originating entity and send slightly non-reputable communications to the least utilized virus detectors, while sending highly non-reputable communications to a highly utilized virus detector, thereby throttling the QoS of a connection associated with a highly non-reputable entity.

Similarly, in situations where a non-reputable entity 1020 has a reputation for originating spam communications, but no other types of non-reputable activities, the load balancer can send the communication to specialized spam detectors 1080 to the exclusion of other types of testing. It should be understood that in situations where a communication is associated with a non-reputable entity 1020 that originates multiple types of non-reputable activity, the communication can be sent to be tested for each of the types of non-reputable activity that the entity 1020 is known to display, while avoiding tests associated with non-reputable activity that the entity 1020 is not known to display.

In some examples, every communication can receive routine testing for multiple types of non-legitimate content. However, when an entity 1020 associated with the communication shows a reputation for certain types of activity, the communication can also be quarantined for detailed testing for the content that the entity shows a reputation for originating.

In yet further examples, every communication may receive the same type of testing. However, communications associated with reputable entities 1010 is sent to the testing modules with the shortest queue or to testing modules with spare processing capacity. On the other hand, communications associated with non-reputable entities 1020 is sent to testing modules 1070, 1080 with the longest queue. Therefore, communications associated with reputable entities 1010 can receive priority in delivery over communications associated with non-reputable entities. Quality of service is therefore maximized for reputable entities 1010, while being reduced for non-reputable entities 1020. Thus, reputation based load balancing can protect the network from exposure to attack by reducing the ability of a non-reputable entity to connect to the network 930.

Figure 11:
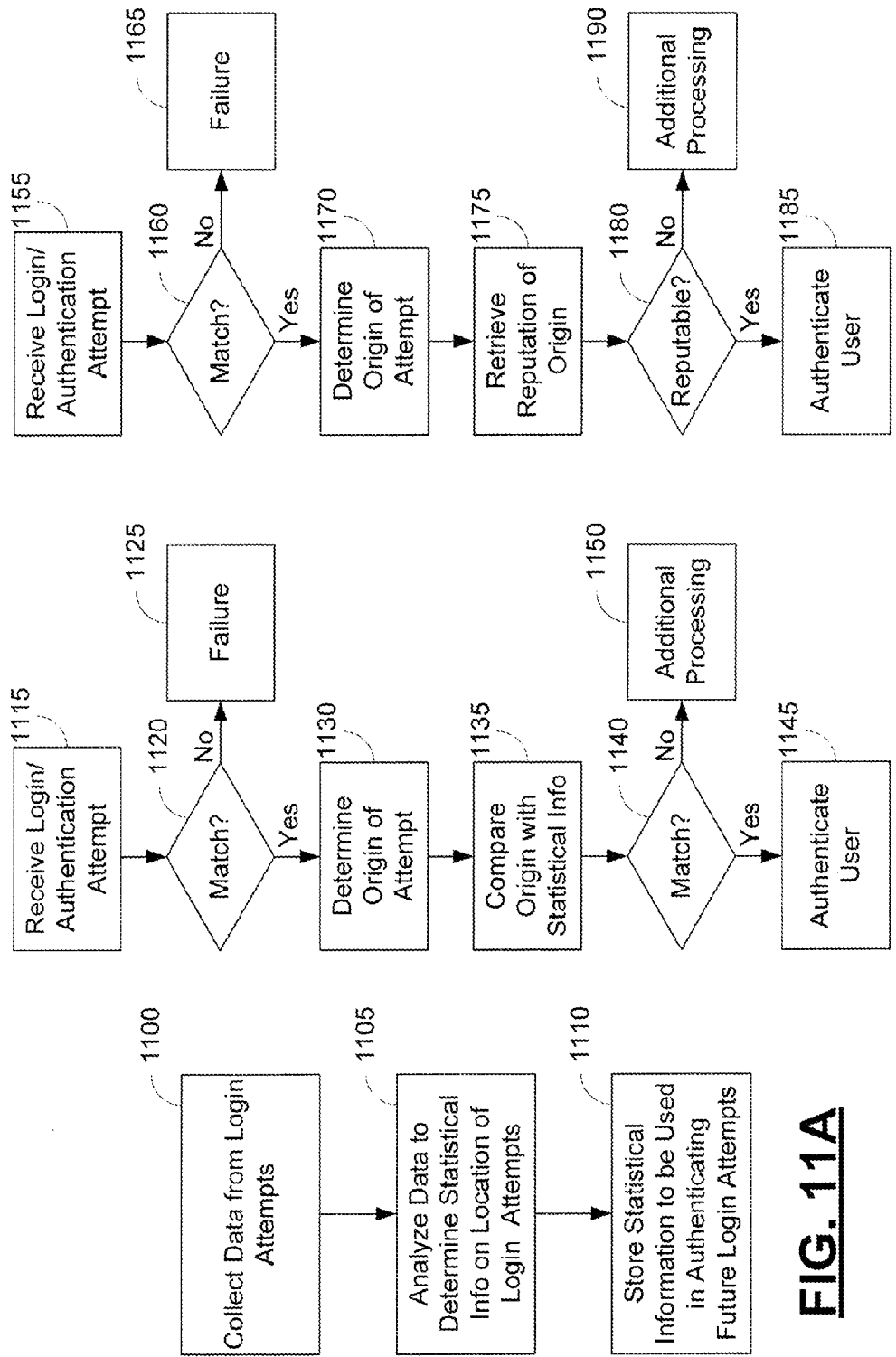
FIG. 11A is a flowchart illustrating an example operational scenario for geolocation based authentication.
FIG. 11B is a flowchart illustrating another example operational scenario for geolocation based authentication.
FIG. 11C is a flowchart illustrating another example operational scenario for geolocation based authentication.

FIG. 11A is a flowchart illustrating an example operational scenario for collection of geolocation based data for authentication analysis. At step 1100 the operational scenario collects data from various login attempts. Step 1100 can be performed for example by a local security agent, such as the security agent 100 of FIG. 1. The collected data can include IP address associated with the login attempt, time of the login attempt, number of login attempts before successful, or the details of any unsuccessful passwords attempted, among many other types of information. The collected data is then analyzed in step 1105 to derive statistical information such as, for example, a geographical location of the login attempts. Step 1105 can be performed, for example, by a reputation engine. The statistical information associated with the login attempts is then stored at step 1110. The storing can be performed, for example, by a system data store.

FIG. 11B is a flowchart illustrating an example operational scenario for geolocation based authentication. A login attempt is received at step 1115. The login attempt can be received for example, by a secure web server operable to provide secure financial data over a network. It is then determined whether the login attempt matches a stored username and password combination at step 1120. Step 1120 can be performed, for example, by a secure server operable to authenticate login attempts. If the username and password do not match a stored username/password combination, the login attempt is declared a failure at step 125.

However, if the username and password do match a legitimate username/password combination, the origin of the login attempt is ascertained at step 1130. The origin of the login attempt can be determined by a local security agent 100 as described in FIG. 1. Alternatively, the origin of the login attempt can be determined by a reputation engine. The origin of the login attempt can then be compared with the statistical information derived in FIG. 11A, as shown in step 1135. Step 1135 can be performed, for example, by a local security agent 100 or by a reputation engine. It is determined whether the origin matches statistical expectations at step 1140. If the actual origin matches statistical expectations, the user is authenticated at step 1145.

Alternatively, if the actual origin does not match statistical expectations for the origin, further processing is performed in step 1150. It should be understood that further processing can include requesting further information from the user to verify his or her authenticity. Such information can include, for example, home address, mother's maiden name, place of birth, or any other piece of information known about the user (e.g., secret question). Other examples of additional processing can include searching previous login attempts to determine whether the location of the current login attempt is truly anomalous or merely coincidental. Furthermore, a reputation associated with the entity originating the login attempt can be derived and used to determine whether to allow the login.

FIG. 11C is a flowchart illustrating another example operational scenario for geolocation based authentication using reputation of an originating entity to confirm authentication. A login attempt is received at step 1155. The login attempt can be received or example, by a secure web server operable to provide secure financial data over a network. It is then determined whether the login attempt matches a stored username and password combination at step 1160. Step 1160 can be performed, for example, by a secure server operable to authenticate login attempts. If the username and password do not match a stored username/password combination, the login attempt is declared a failure at step 1165.

However, if the username and password do match a legitimate username/password combination, the origin of the login attempt is ascertained at step 1170. The origin of the login attempt can be determined by a local security agent 100 as described in FIG. 1. Alternatively, the origin of the login attempt can be determined by a reputation engine. A reputation associated with the entity originating the login attempt can then be retrieved, as shown in step 1175. Step 1175 can be performed, for example, by a reputation engine. It is determined whether the reputation of the originating entity is reputable at step 1180. If the originating entity is reputable, the user is authenticated at step 1185.

Alternatively, if the originating entity is non-reputable, further processing is performed in step 11190. It should be understood that farther processing can include requesting further information from the user to verify his or her authenticity. Such information can include, for example, home address, mother's maiden name, place of birth, or any other piece of information known about the user (e.g., secret question). Other examples of additional processing can include searching previous login attempts to determine whether the location of the current login attempt is truly anomalous or merely coincidental.

Thus, it should be understood that reputation systems can be applied to identifying fraud in financial transactions. The reputation system can raise the risk score of a transaction depending on the reputation of the transaction originator or the data in the actual transaction (source, destination, amount, etc). In such situations, the financial institution can better determine the probability that a particular transaction is fraudulent based upon the reputation of the originating entity.

Figure 12:
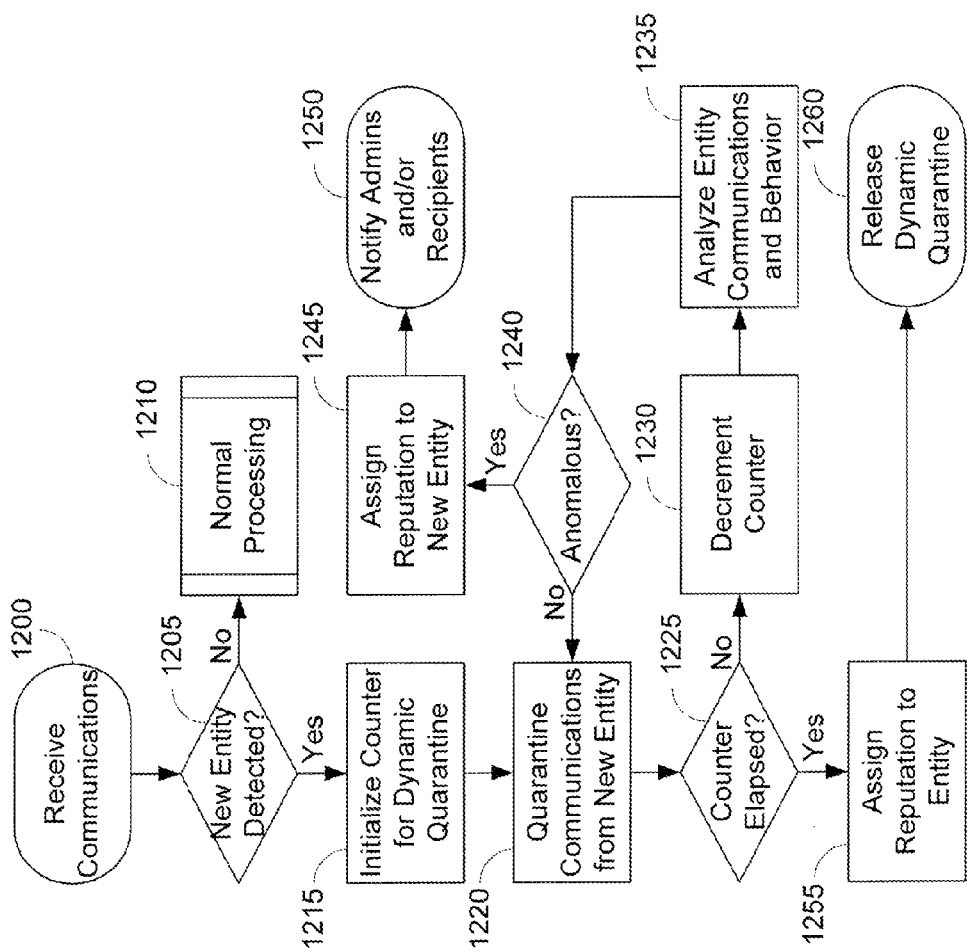
FIG. 12 is a flowchart illustrating an example operational scenario for a reputation based dynamic quarantine.

FIG. 12 is a flowchart illustrating an example operational scenario for a reputation based dynamic quarantine. Communications are received at step 1200. The communications are then analyzed to determine whether they are associated with an unknown entity at step 1205. It should be noted, however, that this operational scenario could be applied to any communications received, not merely communications received from previously unknown entities. For example, communications received from a non-reputable entity could be dynamically quarantined until it is determined that the received communications do no pose a threat to the network. Where the communications are not associated with a new entity, the communications undergo normal processing for incoming communications as shown in step 1210.

If the communications are associated with a new entity, a dynamic quarantine counter is initialized in step 1215. Communications received from the new entity are then sent to a dynamic quarantined at step 1220. The counter is then checked to determine whether the counter has elapsed in step 1225. If the counter has not elapsed, the counter is decremented in step 1230. The behavior of the entity as well as the quarantined communications can be analyzed in step 1235. A determination is made whether the quarantined communications or behavior of the entity is anomalous in step 1240. If there is no anomaly found, the operational scenario returns to step 1220, where new communications are quarantined.

However, if the communications or behavior of the entity are found to be anomalous in step 1240, a non-reputable reputation is assigned to the entity in step 1245. The process ends by sending notification to an administrator or recipients of communications sent by the originating entity.

Returning to step 1220, the process of quarantining and examining communications and entity behavior continues until anomalous behavior is discovered, or until the dynamic quarantine counter elapses in step 1225. If the dynamic quarantine counter elapses, a reputation is assigned to the entity at step 1255. Alternatively, in situations where the entity is not an unknown entity, the reputation would be updated in steps 1245 or 1255. The operational scenario ends at step 1260 by releasing the dynamic quarantine where the dynamic quarantine counter has elapsed without discovery of an anomaly in the communications or in the originating entity behavior.

Figure 13:
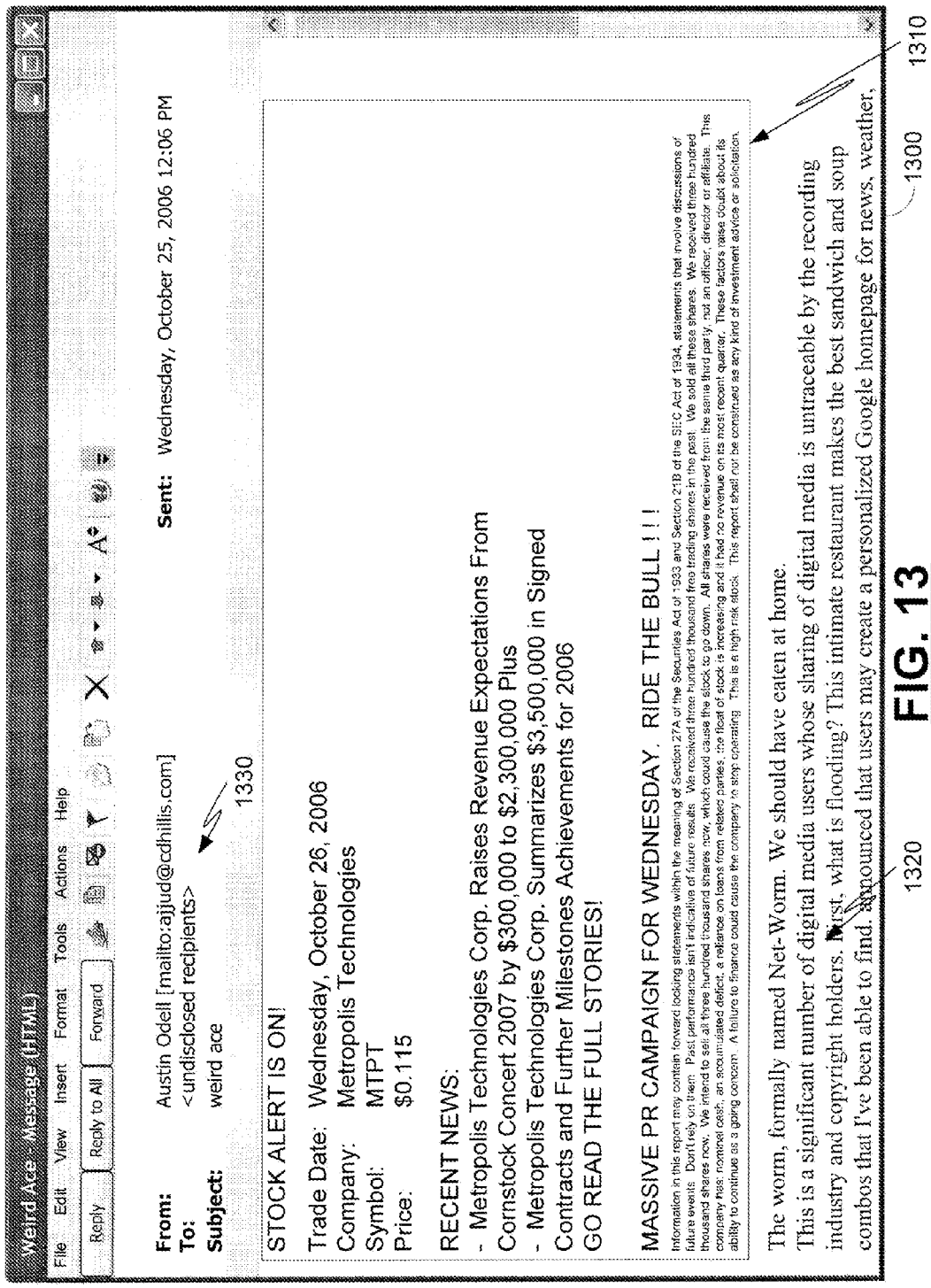
FIG. 13 is an example graphical user interface display of an image spam communication.

FIG. 13 is an example graphical user interface 1300 display of an image spam communication which can be classified as an unwanted image or message. As should be understood, image spam poses a problem for traditional spam filters. Image spam bypasses the traditional textual analysis of spam by converting the text message of the spam into an image format. FIG. 13 shows an example of image spam. The message shows an image 1310. While the image 1300 appears to be textual, it is merely the graphic encoding of a textual message. Image spam also typically includes a textual message 1320 comprising sentences which are structured correctly, but make no sense in the context of the message. The message 1320 is designed to elude spam filters that key on communications that only include an image 1310 within the communication. Moreover, the message 1320 is designed to trick filters that apply superficial testing to the text of a communication that includes an image 1310. Further, while these messages do include information about the origination of the message in the header 1330, an entity's reputation for originating image spam might not be known until the entity is caught sending image spam.

Figure 14:
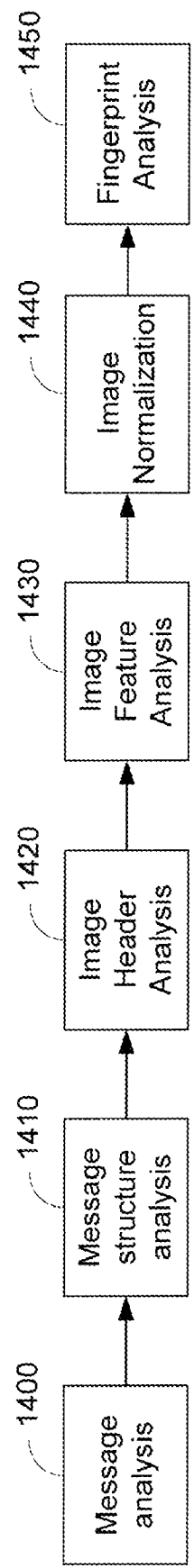
FIG. 14 is a flowchart illustrating an example operational scenario for detecting image

FIG. 14 is a flowchart illustrating an example operational scenario for detecting unwanted images (e.g., image spam). It should be understood that many of the steps shown in FIG. 14 can be performed alone or in combination with any or all of the other steps shown in FIG. 14 to provide some detection of image spam. However, the use of each of the steps in FIG. 14 provides a comprehensive process for detecting image spam.

The process begins at step 1400 with analysis of the communication. Step 1400 typically includes analyzing the communication to determine whether the communication includes an image that is subject to image spam processing. At step 1410, the operational scenario performs a structural analysis of the communication to determine whether the image comprises spam. The header of the image is then analyzed in step 1420. Analysis of the image header allows the system to determine whether anomalies exist with respect to the image format itself (e.g., protocol errors, corruption, etc.). The features of the image are analyzed in step 1430. The feature analysis is intended to determine whether any of the features of the image are anomalous. The image can be normalized in step 1440. Normalization of an image typically includes removal of random noise that might be added by a spammer to avoid image fingerprinting techniques. Image normalization is intended to convert the image into a format that can be easily compared among images. A fingerprint analysis can be performed on the normalized image to determine whether the image matches images from previously received known image spam.

FIG. 15A is a flowchart illustrating an operational scenario for analyzing the structure of a communication. The operational scenario begins at step 1500 with analysis of the message structure. At step 1505 the hypertext markup language (HTML) structure of the communication is analyzed to introduce n-gram tags as additional tokens to a Bayesian analysis. Such processing can analyze the text 1320 that is included in an image spam communication for anomalies. The HTML structure of the message can be analyzed to define meta-tokens. Meta-token is are the HTML content of the message, processed to discard any irrelevant HTML tags and compressed by removing white space to create a "token" for Bayesian analysis. Each of the above described tokens can be used as input to a Bayesian analysis for comparison to previously received communications.

The operational scenario then includes image detection at step 1515. The image detection can include partitioning the image into a plurality of pieces and performing fingerprinting on the pieces to determine whether the fingerprints match pieces of previously received images.

FIG. 15B is a flowchart illustrating an operational scenario for analyzing the features of an image to extract features of the message for input into a clustering engine to identify components of the image which align with known image spam. The operational scenario begins at step 1520 where a number of high level features of the image are detected for use in a machine learning algorithm. Such features can include values such as the number of unique colors, number of noise black pixels, number of edges in horizontal direction (sharp transitions between shapes), etc.

One of the features extracted by the operational scenario can include the number of histogram modes of the image, as show at step 1525. The number of modes is yielded by an examination of spectral intensity of the image. As should be understood, artificial images will typically include fewer modes than natural images, because natural image colors are typically spread through a broad spectrum.

As described above, the features extracted from the image can be used to identify anomalies. In some examples, anomalies can include analyzing the characteristics of a message to determine a level of similarity of a number of features to the features of stored unwanted images. Alternatively, in some examples, the image features can also be analyzed for comparison with known reputable images to determine similarity to reputable images. It should be understood that none of the extracted features alone are determinative of a classification. For example, a specific feature might be associated with 60% of unwanted messages, while also being associated with 40% of wanted messages. Moreover, as the value associated with the feature changed, there might be a change in the probability that the message is wanted or unwanted. There are many features that can indicate a slight tendency. If each of these features are combined the image spam detection system can make classification decision.

The aspect ratio is then examined in step 1530 to determine whether there are any anomalies with respect to the image size or aspect. Such anomalies in the aspect ratio could be indicated by similarity of the image size or aspect ratio to known sizes or aspect ratios which are common to known image spam. For example, image spam can come in specific sizes to make the image spam look more like common e-mail. Messages that include images which share a common size with known spam images are more likely to be spam themselves. Alternatively, there are image sizes which are not conducive to spam (e.g., a 1"×1" square image might be difficult to read if a spammer inserted a message into the image). Messages that include images which are known to be non-conducive to spam insertion are less likely to be image spam. Thus, the aspect ratio of a message can be compared to common aspect ratios used in image spam to determine a probability that the image is an unwanted image or that the image is a reputable image.

At step 1535, the frequency distribution of the image is examined. Typically, natural pictures have uniform frequency distribution with a relative scarcity of sharp frequency gradations. On the other hand, image spam typically includes a choppy frequency distribution as a result of black letters being placed on a dark background. Thus, such non-uniform frequency distribution can indicate image spam.

At step 1540, the signal to noise ratio can be analyzed. A high signal to noise ratio night indicate that a spammer may be trying to evade fingerprinting techniques by introducing noise into the image. Increasing noise levels can thereby indicate an increasing probability that the image is an unwanted image.

It should be understood that some features can be extracted on the scale of the entire image, while other features can be extracted from subparts of the image. For example the image can be subdivided into a plurality of subparts. Each of the rectangles can be transformed into a frequency domain using a fast Fourier transform (FFT). In the transformed image, the predominance of frequencies in a plurality of directions can be extracted as features. These subparts of the transformed image can also be examined to determine the amount of high frequencies and low frequencies. In the transformed image, the points that are further away from the origin represent higher frequencies. Similarly to the other extracted features, these features can then be compared to known legitimate and unwanted images to determine which characteristics the unknown image shares with each type of known image. Moreover, the transformed (e.g., frequency domain) image can also be divided into subparts (e.g., slices, rectangles, concentric circles, etc.) and compared against data from known images (e.g., both known unwanted images and known legitimate images).

FIG. 15C is a flowchart illustrating an operational scenario for normalizing the an image for spam processing. At step 1545, obfuscation and noise is removed from the image. As discussed previously, these can be introduced by spammers to evade fingerprinting techniques such as hashing by varying the sum of the hash such that it does not match any previously received hash fingerprints of known image spam. Obfuscation and noise removal can describe several techniques for removing artificial noise introduced by spammers. It should be understood that artificial noise can include techniques used by spammers such as banding (where a font included in the image is varied to vary the hash of the image).

An edge detection algorithm can be run on the normalized image at step 1550. In some examples, the edge detected image can be used provided to an optical character recognition engine to convert the edge detected image to text. The edge detection can be used to remove unnecessary detail from the picture which can cause inefficiency in processing the image again other images.

At step 1555, median filtering can be applied. The median filtering is applied to remove random pixel noise. Such random pixels can cause problems to content analysis of the image. The median filtering can help to remove single pixel type of noise introduced by spammers. It should be understood that single pixel noise is introduced by spammers using an image editor to alter one or more pixels in the image, which can make the image appear grainy in some areas, thereby making the image more difficult to detect.

At step 1560, the image is quantized. Quantizing of the image remove unnecessary color information. The color information typically requires more processing and is unrelated to the attempted propagation of the spam. Moreover, spammers could vary the color scheme in an image slightly and again vary the hash such that known image spam hashes would not match the derived hash from the color variant image spam.

At step 1565, contrast stretching is performed. Using contrast stretching the color scale in the image is maximized from black to white, even if the colors only vary through shades of gray. The lightest shade of the image is assigned a white value, while the darkest shade in the image is assigned a black value. All other shades are assigned their relative position in the spectrum in comparison to the lightest and darkest shades in the original image. Contrast stretching helps to define details in an image that may not make full use of the available spectrum and therefore can help to prevent spammers from using different pieces of the spectrum to avoid fingerprinting techniques. Spammers sometimes intentionally shift the intensity range of an image to defeat some types of feature identification engines. Contrast stretching can also help normalize an image such that it can be compared to other images to identify common features contained in the images.

FIG. 15D is a flowchart illustrating an operational scenario for analyzing the fingerprint of an image to find common fragments among multiple images. The operational scenario begins a step 1570 by defining regions within an image. A winnowing algorithm is then performed on the defined regions to identify the relevant portions of the image upon which fingerprints should be taken at step 1575. At step 1580, the operational scenario fingerprints the resulting fragments from the winnowing operation and determines whether there is a match between the fingerprints of the received image an known spam images. A similar winnowing fingerprint approach is described in United States Patent Application Publication No. 2006/0251068, which is hereby incorporated by reference.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

A number of embodiments of the invention have been described. Nevertheless it will be understood that various modifications may be made without departing from the spirit and scope of the invention. Accordingly, other embodiments are within the scope of the following claims.

What is claimed is:

1. A computer implemented method operable to assign a reputation to a communications entity associated with a received communication, the method comprising:

dispersing a plurality of agents within a widely distributed network, each of the agents being associated with a respective security device operable to protect an associated network from communications that violate a policy associated with the associated network;

collecting data associated with communications from a plurality of entities originating communications, the plurality of entities including a reputable entity with a reputable reputation, a non-reputable entity with a non-reputable reputation and an unknown entity with an unknown reputation, wherein collecting data comprises using the plurality of agents to collect data associated with the communications;

aggregating the collected data;

analyzing the aggregated data to identify attributes respectively associated with the communications from the plurality of entities;

correlating the attributes to identify relationships between each of the plurality of entities, each identified relationship between entities is associated with a strength based on similarities between the attributes of communications from the entities;

attributing, by one or more data processors, a portion of reputable qualities from the reputable entity to the reputation of the unknown entity based on the strength of the relationship between the reputable entity and the unknown entity;

attributing, by the one or more data processors, a portion of non-reputable qualities from the non-reputable entity to the reputation of the unknown entity based on the strength of the relationship between the non-reputable entity and the unknown entity;

updating the reputation of the unknown entity based upon the portion of reputable qualities attributed to the unknown entity from the reputable entity and the portion of non-reputable qualities attributed to the unknown entity from the non-reputable entity, wherein the reputation of the unknown entity comprises indications of a reputation of the unknown entity in a plurality of categories representing types of activity in which the unknown entity or related entities have engaged; and communicating data specifying the updated reputation information of the unknown entity to one or more of the plurality of agents.

2. The method of claim 1, wherein the indications comprise a reputation vector.

3. The method of claim 2, further comprising using the communicated updated reputation information to determine whether to allow a voice over internet protocol connection or a short message service connection.

4. The method of claim 3, further comprising comparing the reputation information to a policy to determine whether to allow a voice over internet protocol connection or a short message service connection.

5. The method of claim 4, wherein the policy is defined by an administrator of the associated network to which the policy belongs.

6. The method of claim 2, further comprising using the communicated reputation information to determine one or more selected interrogation engines selected from a plurality of interrogation engines, wherein the selected interrogation engines will interrogate a received communication.

7. The method of claim 6, wherein the one or more selected interrogation engines omit any of the plurality of interrogation engines that test for risks that are not implicated by the reputation vector.

8. The method of claim 2, further comprising using the communicated reputation information to determine which of a plurality of agents to use for interrogation of a received communication.

9. The method of claim 8, wherein a communication associated with an entity that does not comply with a policy for the associated network is assigned to an agent based on the interrogation volume of the agent's interrogation queue.

10. The method of claim 8, wherein a communication associated with an entity that complies with a policy for the associated network is assigned to an agent based on the interrogation volume of the agent's interrogation queue.

11. The method of claim 2, wherein the reputation comprises one or more of a reputation for originating spam, a reputation for originating image spam, a reputation for originating attacks, a reputation for intrusion, a reputation for originating phishing communications, a geolocation-based reputation, or a reputation for originating bulk mail.

12. The method of claim 2, wherein the plurality of agents include local reputation information, the local reputation information comprising one or more reputations respectively associated with one or more entities.

13. The method of claim 12, further comprising:
aggregating the local reputation information; and
deriving a global reputation vector based upon the aggregation of the local reputation information.

14. The method of claim 13, further comprising:
receiving a reputation query from an agent;
deriving the global reputation vector responsive to the reputation query; and
communicating the global reputation vector to the agent originating the reputation query.

15. The method of claim 14, wherein the local reputation information comprises a plurality of local reputations and confidence values associated with the local reputations, wherein aggregating the local reputation information comprises adjusting each of the local reputations by an associated confidence value and combining the adjusted local reputations to produce a native global reputation vector.

16. The method of claim 15, further comprising applying a transform to the native global reputation vector to produce the global reputation vector.

17. The method of claim 16, wherein the transform comprises a local bias associated with the agent originating the reputation query.

18. The method of claim 17, wherein the local bias is operable to adjust the native global bias based upon preferences associated with the associated network.

19. The method of claim 1, wherein the entities comprise web entities operable to receive hypertext transfer protocol requests and to communicate one or more web pages responsive to the hypertext transfer protocol requests, wherein the reputation associated with the web entities comprises a reputation for communication of non-reputable web pages.

20. A computer implemented method operable to assign a reputation to a communications entity associated with a received communication, comprising:
collecting data associated with communications from a plurality of entities originating communications, the plurality of entities including a reputable entity with a reputable reputation, a non-reputable entity with a non-reputable reputation and an unknown entity with an unknown reputation, wherein collecting data comprises receiving data from a plurality of agents dispersed in a widely distributed network and associated with respective security devices to collect data associated with the communications;
aggregating the collected data;
analyzing the aggregated data to identify attributes respectively associated with the communications from the plurality of entities;
correlating the attributes to identify relationships between each of the plurality of entities each identified relationship between entities is associated with a strength based on similarities between the attributes of communications from the entities;
attributing, by one or more data processors, a portion reputable qualities from the reputable entity to the reputation of the unknown entity based on the strength of the relationship between the reputable entity and the unknown entity;
attributing, by the one or more data processors, a portion of non-reputable qualities from the non-reputable entity to the reputation of the unknown entity based on the strength of the relationship between the non-reputable entity and the unknown entity;
updating the reputation of the unknown entity based upon the portion of reputable qualities attributed to the unknown entity from the reputable entity and the portion of non-reputable qualities attributed to the unknown entity from the non-reputable entity, wherein the reputation of the unknown entity comprises indications of a reputation of the unknown entity in a plurality of categories representing types of activity in which the unknown entity or related entities have engaged; and handling communications based upon the updated reputation.

21. A distributed system operable to derive and communicate a reputation associated with a communications entity, comprising:
  a communications device operable to communicate with a plurality of agents dispersed within a global network, each of the agents being operable to derive respective local reputations associated with entities from which communications are received, wherein the plurality of agents are further operable to collect data associated with received communications;
  one or more data aggregation engines operable to aggregate the collected data via the communications device;
  computer memory operable to store the aggregated data;
  an analyzer operable to analyze the data to identify attributes respectively associated with entities originating the received communications, wherein the originating entities including a reputable entity with a reputable reputation, a non-reputable entity with a non-reputable reputation and an unknown entity with an unknown reputation;
  a correlation engine operable to correlate the attributes associated with the originating entities and to identify relationships between the entities, each identified relationship between originating entities associated with a strength based on similarities between the attributes of communications from the entities;
  a reputation engine operable to:
    identify relationships between the originating entities;
    attribute a portion of reputable qualities from the reputable entity to the reputation of the unknown entity based on the strength of the relationship between the reputable entity and the unknown entity;
    attribute a portion of non-reputable qualities from the non-reputable entity to the reputation of the unknown entity based on the strength of the relationship between the non-reputable entity and the unknown entity; and
    update the reputation associated with the unknown entity based upon the portion of reputable qualities attributed to the unknown entity from the reputable entity and the portions of non-reputable qualities attributed to the unknown entity from the non-reputable entity, wherein the reputation of the unknown entity comprises indications of a reputation of the unknown entity in a plurality of categories representing types of activity in which the unknown entity or related entities have engaged; and
  wherein the communications device is further operable to communicate the updated reputation information to devices operating on the global network.

22. The system of claim 21, wherein the indications comprise a reputation vector.

23. The system of claim 22, wherein the devices operating on the global network are operable to use the communicated updated reputation information to determine whether to allow a voice over interne protocol connection or a short message service connection.

24. The system of claim 23, wherein the devices are operable to compare reputation information to a policy to determine whether to allow a voice over internet protocol connection or a short message service connection.

25. The system of claim 24, wherein the policy is defined by an administrator of the associated network to which the device belongs.

26. The system of claim 22, further comprising a load balancer operable to use the communicated reputation information to select one or more interrogation engines from a plurality of interrogation engines, wherein the one or more selected interrogation engines will interrogate a received communication.

27. The system of claim 26, wherein the one or more selected interrogation engines comprise those of the plurality of interrogation engines that test for risks that are implicated by the reputation vector.

28. The system of claim 22, further comprising a load balancer operable to use the communicated reputation information to determine which of a plurality of agents to use for interrogation of a received communication.

29. The system of claim 28, wherein a communication associated with an entity that does not comply with a policy for the associated network is assigned to an agent based on an interrogation volume of an interrogation queue for the agent.

30. The system of claim 28, wherein a communication associated with an entity that complies with policy for the associated network is assigned to an agent based on an interrogation volume of an interrogation queue for the agent.

31. The system of claim 22, wherein the reputation comprises one or more of a reputation for originating spam, a reputation for originating image spam, a reputation for originating attacks, a reputation for intrusion, a reputation for originating phishing communications, or a reputation for originating bulk mail.

32. The system of claim 22, wherein the plurality of agents include local reputation information, the local reputation information comprising one or more reputations respectively associated with one or more entities.

33. The system of claim 32, further comprising a reputation aggregation engine operable to aggregate local reputation information retrieved from the plurality of agents, and to derive a global reputation vector based upon the aggregation of the local reputation information.

34. The system of claim 33, wherein the communications device is operable to receive a reputation query from an agent, and the reputation aggregation engine is operable to derive the global reputation vector responsive to the reputation query, whereby the communications device can communicate the global reputation vector to the agent originating the reputation query.

35. The system of claim 34, wherein the local reputation information comprises a plurality of local reputations and confidence values associated with the local reputations, wherein reputation aggregation engine is operable to adjust each of the local reputations by an associated confidence value and combining the adjusted local reputations to produce a native global reputation vector.

36. The system of claim 35, wherein the reputation aggregation engine is further operable to apply a transform to the native global reputation vector to produce the global reputation vector.

37. The system of claim 36, wherein the transform comprises a local bias associated with the agent originating the reputation query.

38. The system of claim 37, wherein the local bias is operable to adjust the native global bias based upon preferences associated with the associated network.

39. The system of claim 21, wherein the entities comprise web entities operable to receive hypertext transfer protocol requests and to communicate one or more web pages responsive to the hypertext transfer protocol requests, wherein the reputation associated with the web entities comprises a reputation for communication of non-reputable web pages.

* * * * *